United States Patent
Inoko

(10) Patent No.: US 9,632,403 B2
(45) Date of Patent: Apr. 25, 2017

(54) LIGHT SOURCE OPTICAL SYSTEM CAPABLE OF USING CONVERTED LIGHT AND NON-CONVERTED LIGHT FROM WAVELENGTH CONVERSION ELEMENT, LIGHT SOURCE APPARATUS USING THE SAME, AND IMAGE DISPLAY APPARATUS

(71) Applicant: CANON KABUSHIKI KAISHA, Tokyo (JP)

(72) Inventor: Kazuhiro Inoko, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 14/610,995

(22) Filed: Jan. 30, 2015

(65) Prior Publication Data

US 2015/0222864 A1    Aug. 6, 2015

(30) Foreign Application Priority Data

Feb. 3, 2014  (JP) .................................. 2014-018955
Dec. 24, 2014  (JP) .................................. 2014-261195

(51) Int. Cl.
  *G03B 21/20*    (2006.01)
  *F21V 9/14*    (2006.01)
  (Continued)

(52) U.S. Cl.
  CPC .............. *G03B 21/204* (2013.01); *F21V 9/14* (2013.01); *F21V 13/14* (2013.01); *G02B 5/3083* (2013.01); *G02B 27/141* (2013.01); *G02B 27/283* (2013.01); *G03B 21/208* (2013.01); *H04N 9/3158* (2013.01); *H04N 9/3161* (2013.01); *H04N 9/3167* (2013.01)

(58) Field of Classification Search
  CPC ..... G03B 21/204; G02B 27/30; H04N 9/3158
  See application file for complete search history.

(56) References Cited

U.S. PATENT DOCUMENTS 6,101,040 A * 8/2000 Itoh ...................... G02B 3/0043
                                                    348/E9.027
6,286,961 B1 * 9/2001 Ogawa ............... G02B 27/0905
                                                    348/E5.137
(Continued)

FOREIGN PATENT DOCUMENTS

CN         1627126 A    6/2005
CN       102289141 A   12/2011
(Continued)

*Primary Examiner* — Bao-Luan Le
(74) *Attorney, Agent, or Firm* — Canon USA Inc., IP Division

(57) ABSTRACT

A light source optical system guides blue light from a light source to a fluorescent body. The fluorescent body converts the blue light into fluorescent light and emits the fluorescent light and non-converted light. Further, the light source optical system includes an optical element having a first region for guiding the blue light to the fluorescent body and a second region for guiding the fluorescent light and the non-converted light to lens cells. The blue light is incident on the first region, and the fluorescent light and the non-converted light are incident on the first region and the second region of the optical element. An area of the first region and an area of each lens cell of the lens cells as viewed along directions of optical axes of the lens cells have a predetermined relationship.

19 Claims, 22 Drawing Sheets

(51) Int. Cl.
*F21V 13/14* (2006.01)
*G02B 5/30* (2006.01)
*G02B 27/14* (2006.01)
*G02B 27/28* (2006.01)
*H04N 9/31* (2006.01)

(56) References Cited

U.S. PATENT DOCUMENTS

| | | | | |
|---|---|---|---|---|
| 8,562,146 B2 * | 10/2013 | Kitano | G03B 21/204 | 353/31 |
| 8,585,208 B2 * | 11/2013 | Akiyama | G03B 21/2013 | 353/31 |
| 8,678,596 B2 * | 3/2014 | Sakata | G02B 7/008 | 313/506 |
| 8,982,463 B2 * | 3/2015 | Ouderkirk | G02B 27/1033 | 359/485.01 |
| 9,004,701 B2 * | 4/2015 | Berben | A61B 18/22 | 353/31 |
| 9,039,187 B2 * | 5/2015 | Katou | G02B 5/26 | 362/30 |
| 9,074,755 B2 * | 7/2015 | Finsterbusch | F21K 9/56 | |
| 9,151,471 B2 * | 10/2015 | Ogura | F21V 13/08 | |
| 9,152,031 B2 * | 10/2015 | Wei | G03B 21/204 | |
| 2010/0328632 A1 | 12/2010 | Kurosaki et al. | | |
| 2011/0228232 A1 * | 9/2011 | Sakata | G02B 7/008 | 353/31 |
| 2011/0292349 A1 | 12/2011 | Kitano et al. | | |
| 2011/0310362 A1 | 12/2011 | Komatsu | | |
| 2011/0310363 A1 * | 12/2011 | Kita | G03B 21/204 | 353/98 |
| 2012/0127435 A1 * | 5/2012 | Kitano | G03B 21/204 | 353/20 |
| 2012/0154767 A1 * | 6/2012 | Kimura | H04N 9/315 | 353/98 |
| 2012/0236264 A1 * | 9/2012 | Akiyama | G03B 21/2013 | 353/37 |
| 2012/0299801 A1 * | 11/2012 | Kitano | F21V 5/007 | 345/32 |
| 2012/0316397 A1 * | 12/2012 | Berben | A61B 18/22 | 600/182 |
| 2013/0038847 A1 * | 2/2013 | Katou | G02B 5/26 | 353/98 |
| 2013/0088850 A1 * | 4/2013 | Kroell | G02B 5/09 | 362/84 |
| 2013/0100644 A1 * | 4/2013 | Hu | F21V 7/22 | 362/84 |
| 2013/0114044 A1 | 5/2013 | Inoue et al. | | |
| 2013/0169894 A1 * | 7/2013 | Ouderkirk | G02B 27/1033 | 349/9 |
| 2013/0176540 A1 * | 7/2013 | Wei | G03B 21/204 | 353/20 |
| 2013/0250253 A1 * | 9/2013 | Ogura | F21V 13/08 | 353/85 |
| 2013/0250546 A1 * | 9/2013 | Hu | F21V 9/08 | 362/84 |
| 2013/0258639 A1 * | 10/2013 | Hu | F21V 9/08 | 362/84 |
| 2013/0271947 A1 * | 10/2013 | Finsterbusch | F21K 9/56 | 362/19 |
| 2013/0322056 A1 * | 12/2013 | Konuma | F21V 13/14 | 362/84 |
| 2014/0253849 A1 * | 9/2014 | Poon | G02B 27/102 | 349/97 |

FOREIGN PATENT DOCUMENTS

| | | |
|---|---|---|
| CN | 104035266 A | 9/2014 |
| JP | 2009-276546 A | 11/2009 |
| JP | 2011-128522 A | 6/2011 |
| JP | 2011-221502 A | 11/2011 |
| JP | 2012-13977 A | 1/2012 |
| JP | 2012-14972 A | 1/2012 |
| WO | 2014/046219 A1 | 3/2014 |

* cited by examiner

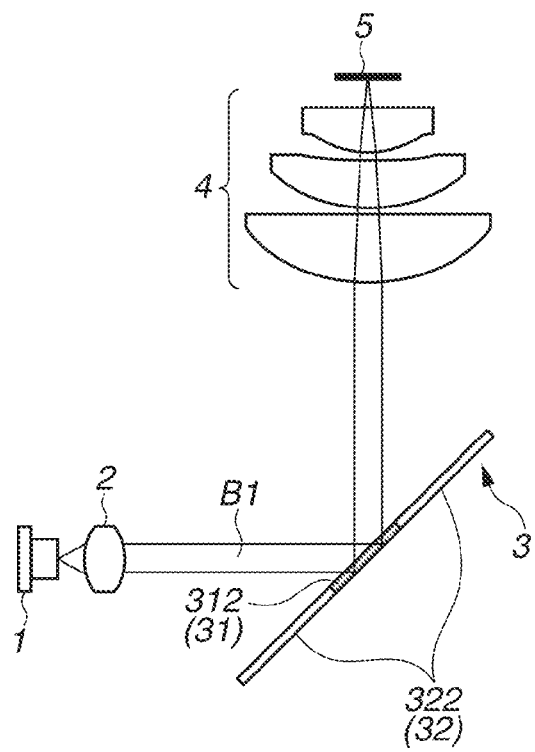
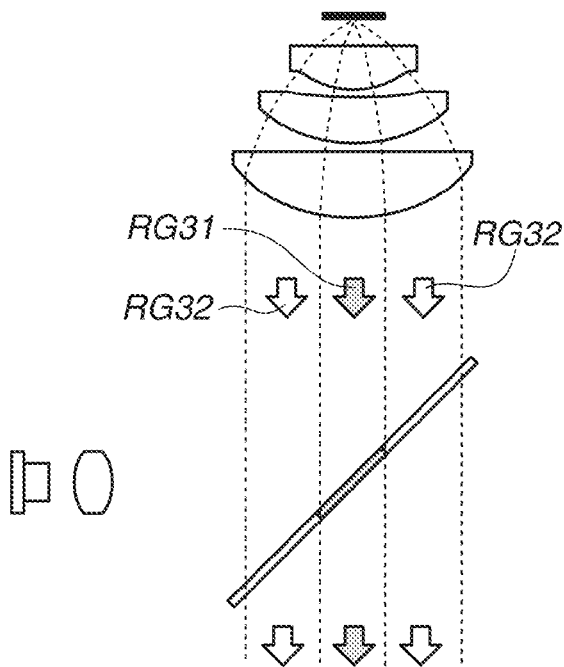
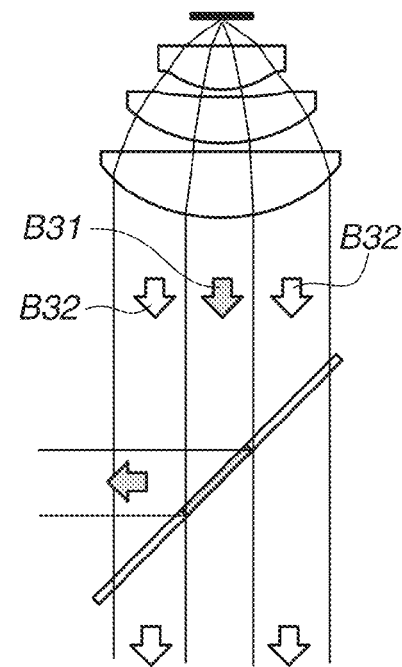
FIG. 6A
FIG. 6B
FIG. 6C

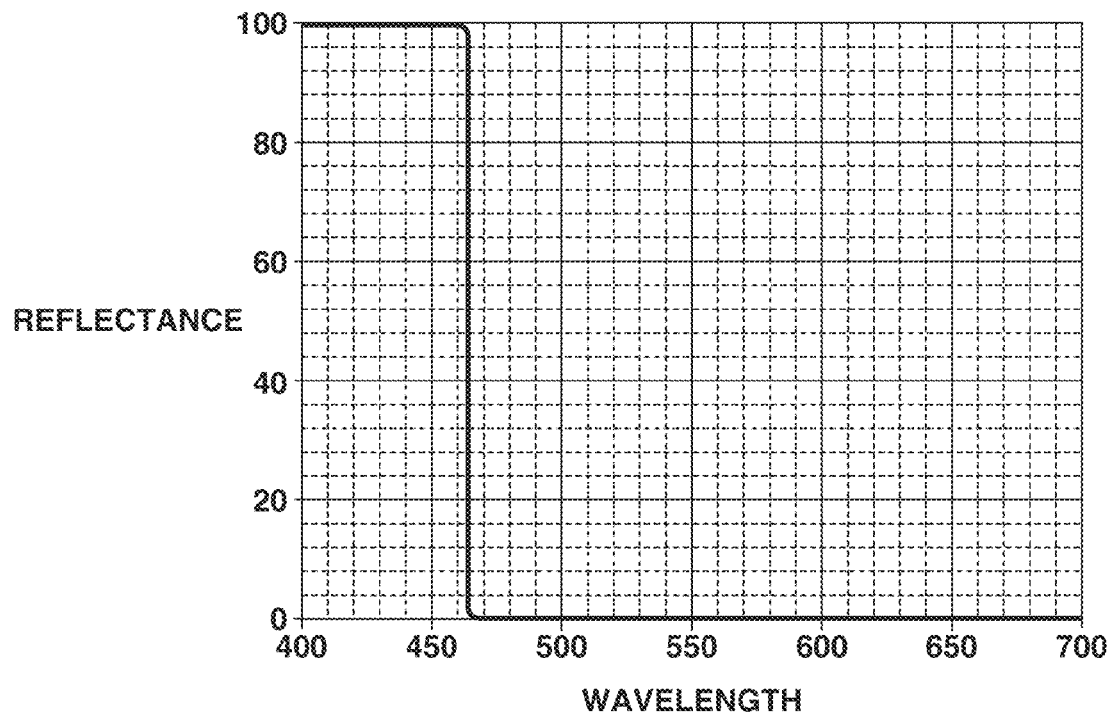
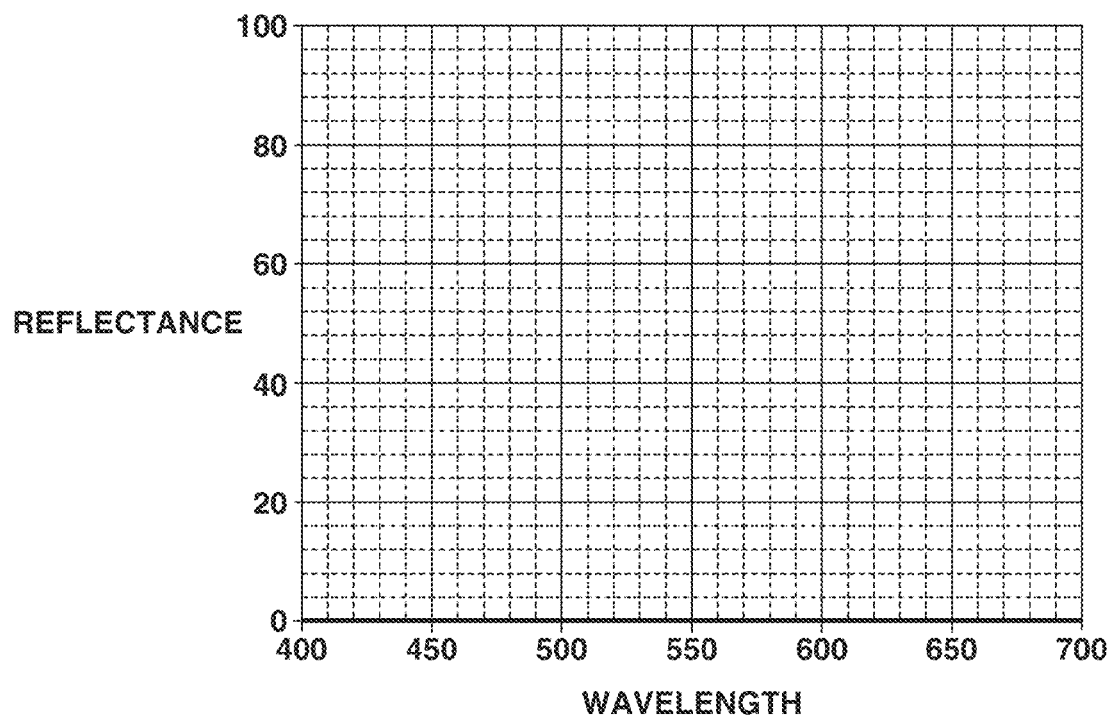

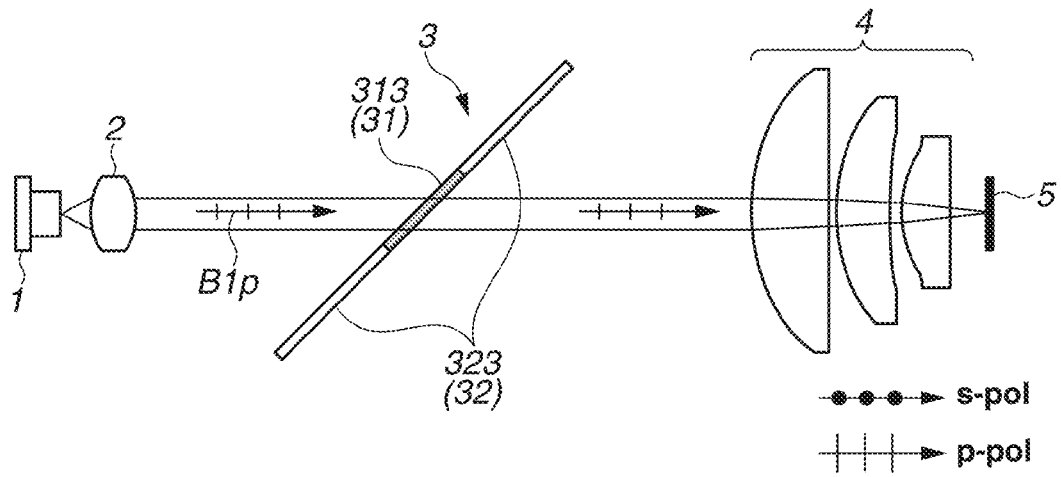
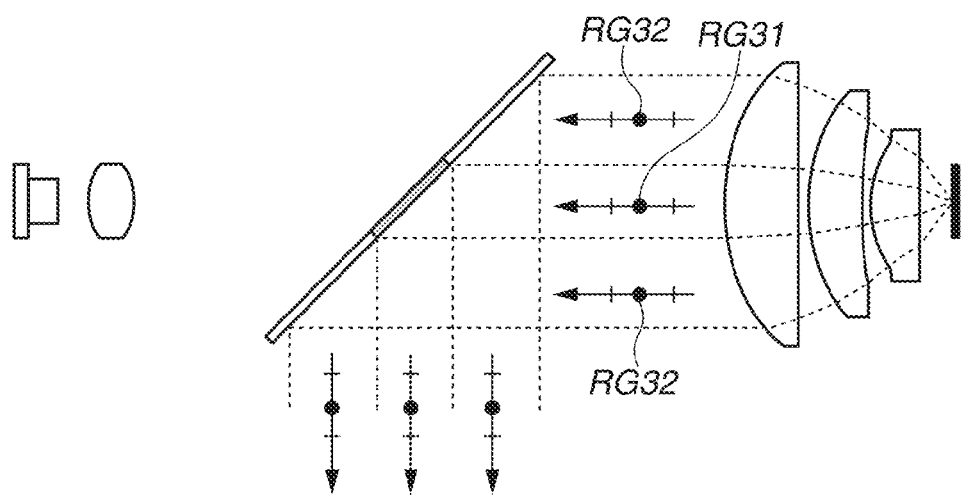
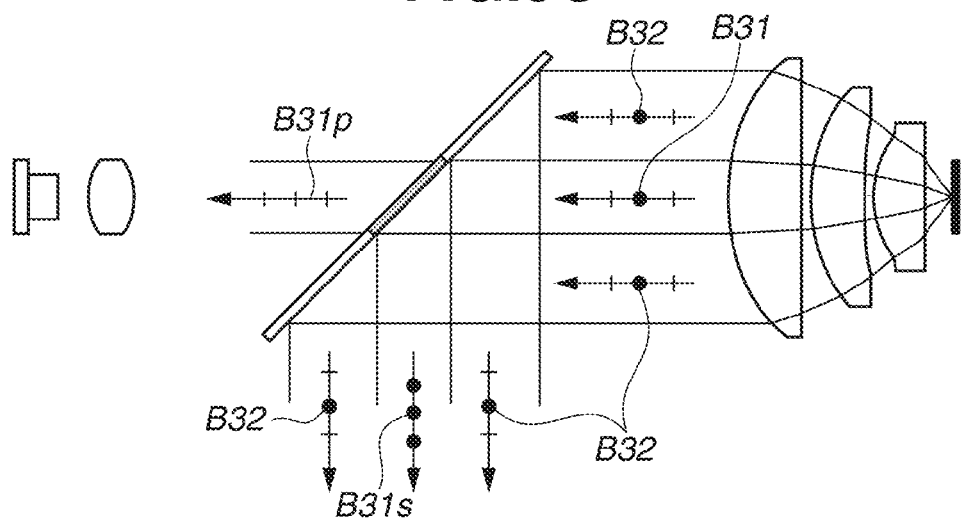

LIGHT SOURCE OPTICAL SYSTEM CAPABLE OF USING CONVERTED LIGHT AND NON-CONVERTED LIGHT FROM WAVELENGTH CONVERSION ELEMENT, LIGHT SOURCE APPARATUS USING THE SAME, AND IMAGE DISPLAY APPARATUS

BACKGROUND OF THE INVENTION

Field of the Invention

The present invention relates to a light source optical system, a light source apparatus using the same, and an image display apparatus such as a projector, and in particular, relates to a light source apparatus using a laser diode (LD) light source and a projection display apparatus on which the light source apparatus using the LD light source is mounted.

Description of the Related Art

In recent years, a projector has been developed that can display a color image using a fluorescent body for converting blue light received from a LD light source into green light and red light.

Examples of such projector are discussed in US2010/0328632 and US2011/0292349.

US2010/0328632 discusses a technique for displaying a color image using blue light from a LD light source in addition to green light and red light emitted as fluorescent light. A fluorescent wheel is rotated and includes a diffusion layer that can transmit the blue light from the LD light source, and a fluorescent layer that acts as a fluorescent body (phosphor). If the diffusion layer has been irradiated with the blue light from the LD light source, the blue light passes through the fluorescent layer and is guided to an illumination optical system by a reflecting mirror. If, on the other hand, the fluorescent layer has been irradiated with the blue light from the LD light source, the green light and the red light are emitted in the direction of the light source and guided to the illumination optical system by a dichroic mirror.

US2011/0292349 discusses a technique for using blue light emitted from a blue light-emitting diode (LED) provided separately from an LD light source, in addition to green light and red light emitted as fluorescent light, thereby displaying a color image.

SUMMARY OF THE INVENTION

According to an aspect of the present invention, a light source optical system for guiding light from a light source to a fly's eye lens including a plurality of lens cells includes: a wavelength conversion element configured to convert light emitted from the light source into converted light having a wavelength different from a wavelength of the light emitted from the light source and emit the converted light and non-converted light having the same wavelength as the wavelength of the light emitted from the light source, and an optical element including a first region which guides the light from the light source to the wavelength conversion element through a lens unit, and a second region which guides the converted light and the non-converted light in a direction different from a direction of the light source, wherein the light from the light source is incident on the first region of the optical element, and the converted light and the non-converted light are incident on the first region and the second region of the optical element, and wherein, when an area of the first region as viewed along directions of optical axes of the lens cells is A, an area of each lens cell as viewed along the directions of the optical axes of the lens cells is B, and n is a natural number, $B \times (n-0.1) \leq A \leq B \times (n+0.1)$ is satisfied.

Further features of the present invention will become apparent from the following description of exemplary embodiments with reference to the attached drawings.

BRIEF DESCRIPTION OF THE DRAWINGS

FIGS. 6A, 6B, and 6C are diagrams illustrating the configuration of a light source apparatus according to a second exemplary embodiment of the present invention.

FIGS. 7A and 7B are diagrams illustrating the spectral reflection characteristics of an optical element used in the second exemplary embodiment of the present invention.

FIGS. 9A, 9B, and 9C are diagrams illustrating the configuration of a light source apparatus according to a third exemplary embodiment of the present invention.

DESCRIPTION OF THE EMBODIMENTS

A fluorescent body converts the wavelengths of blue light from an LD light source to the wavelengths of green light and red light. However, not all the wavelengths of the blue light are converted. Therefore, there is also non-converted light, of which the wavelengths have not been converted by the fluorescent body and which returns from the fluorescent body to the LD light source.

The non-converted light returning to the LD light source tends to raise the temperature of the LD light source and reduce the light emission efficiency of the LD light source. Thus, the non-converted light returning to the LD light source may lead to a functional decline such as degrading the brightness of an image to be projected.

The embodiments of the present invention disclose a light source optical system capable of reducing the amount of non-converted light returning from a wavelength conversion element to a light source. An embodiment of the present invention is directed to a light source apparatus and an image display apparatus using the light source optical system that can project a brighter image than conventional apparatuses of the same type.

With reference to the drawings, suitable exemplary embodiments of the present invention will be described below in an illustrative manner. However, the shapes of components and the relative arrangement of the components described in these exemplary embodiments may be appropriately changed depending on the configuration of an apparatus and various conditions to which the present invention is applied. That is, the shapes of the components are not defined to limit the scope of the present invention to the following exemplary embodiments.

(Description of Configuration of Projection Display Apparatus)

Figure 1:
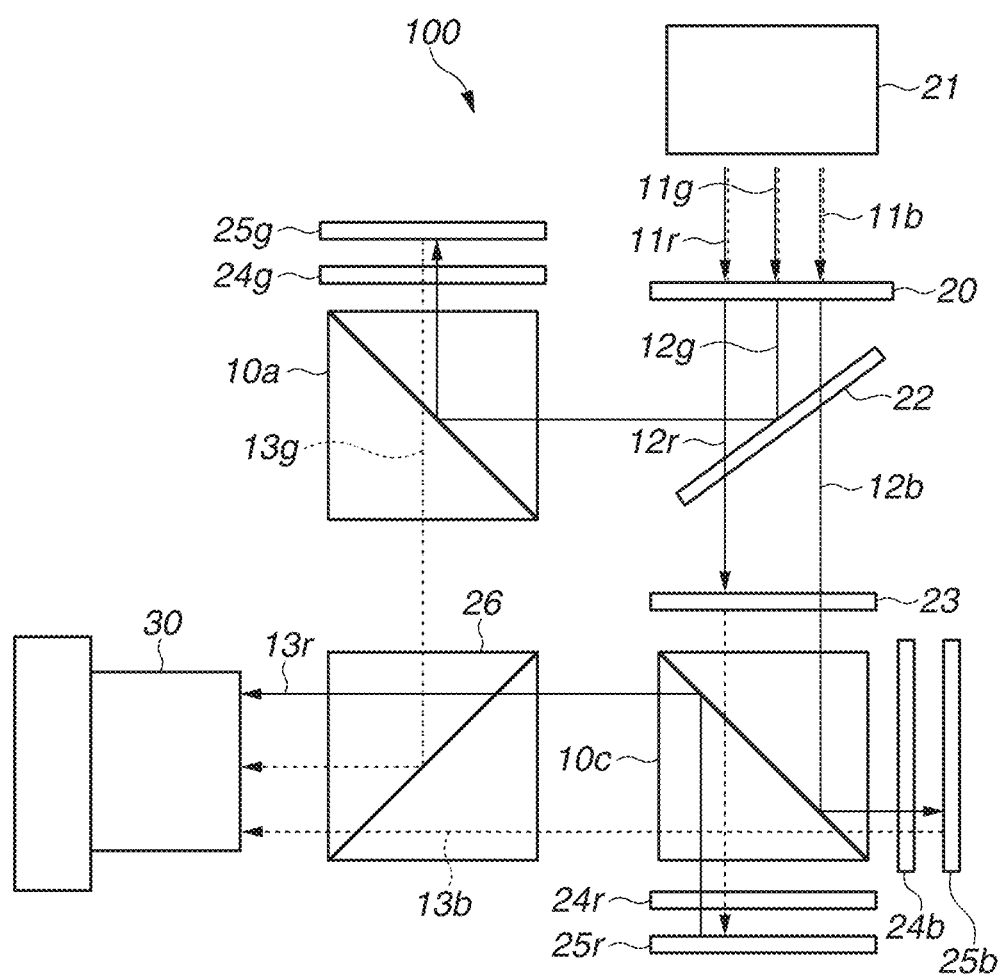
FIG. 1 is a diagram illustrating the configuration of a projection display apparatus on which a light source apparatus according to exemplary embodiments of the present invention can be mounted.

First, with reference to FIG. 1, a description is given of the configuration of a projection display apparatus 100, which is an image display apparatus on which a light source apparatus according to exemplary embodiments of the present invention can be mounted.

The display apparatus (projection display apparatus) 100 includes a light source apparatus 21, a polarizing plate 20, a dichroic mirror 22, a phase plate (wavelength-selective phase plate) 23, and a polarizing beam splitter (PBS) (10a and 10c).

Further, the display apparatus 100 includes a quarter-λ plate for each color (a red quarter-λ plate 24r, a green quarter-λ plate 24g, and a blue quarter-λ plate 24b).

Further, the display apparatus 100 includes a liquid crystal panel (reflective liquid crystal panel) for each color (a red liquid crystal panel 25r, a green liquid crystal panel 25g, and a blue liquid crystal panel 25b), which is a light modulation element.

Further, the display apparatus 100 includes a dichroic prism 26 and a projection lens 30. That is, the display apparatus 100 is a so-called reflective liquid crystal projector.

The light source apparatus 21 is a light source apparatus according to any one of the exemplary embodiments of the present invention described below.

The polarizing plate 20 is configured to transmit only s-polarized light (red s-polarized light 12r, green s-polarized light 12g, and blue s-polarized light 12b) among white light (red light 11r, green light 11g, and blue light 11b) received from the light source apparatus 21.

The dichroic mirror 22 is configured to have reflectance characteristics of reflecting light in the green wavelength range and transmitting light in the red wavelength range and light in the blue wavelength range.

The phase plate 23 transmits polarized light in the blue wavelength range without changing the polarization direction of the polarized light. On the other hand, the phase plate 23 is configured to change the polarization direction of polarized light in the red wavelength range by 90 degrees.

The PBS is configured to reflect s-polarized light and transmit p-polarized light.

The quarter-λ plate gives a phase difference of λ/2 to obliquely incident light, there and back, thereby increasing the effect of the PBS which analyzes the obliquely incident light.

The liquid crystal panel changes the polarization direction of light incident on the liquid crystal panel according to an image signal. Further, the liquid crystal panel emits image light (red image light 13r, green image light 13g, and blue image light 13b). The polarization direction of the image light is changed by the liquid crystal panel.

The dichroic prism 26 is configured to have reflectance characteristics of reflecting light in the green wavelength range and transmitting light in the red wavelength range and light in blue wavelength range.

The projection lens 30 is configured to guide light combined in the dichroic prism 26 to a screen.

A description is given of the process up until the white light from the light source apparatus 21 reaches the projection lens 30.

Among the white light from the light source apparatus 21, only s-polarized light passes through the polarizing plate 20 and is guided to the dichroic mirror 22. Among the s-polarized light, the green s-polarized light 12g is reflected and guided to the PBS 10a, and the red s-polarized light 12r and the blue s-polarized light 12b pass through the dichroic mirror 22 and are guided to the PBS 10c.

The green s-polarized light 12g guided to the PBS 10a is reflected by the PBS 10a and guided to the green quarter-λ plate 24g. The polarization direction of the green s-polarized light 12g is changed by the green liquid crystal panel 25g, and the green s-polarized light 12g is reflected by the green liquid crystal panel 25g. Among the light from the green liquid crystal panel 25g, p-polarized light is guided as the green image light 13g to the dichroic prism 26.

Also the red s-polarized light 12r and the blue s-polarized light 12b guided to the PBS 10c are guided as the red image light 13r and the blue image light 13b, respectively, to the dichroic prism 26 similarly to the green s-polarized light 12g.

The red image light 13r, the green image light 13g, and the blue image light 13b guided to the dichroic prism 26 are combined together, and the combined image light is guided to the projection lens 30. Consequently, it is possible to project and display a color image on the screen.

A configuration applicable to the light source apparatus 21 is described below.

The light source apparatus according to the exemplary embodiments of the present invention includes a light source 1, a fluorescent body (wavelength conversion element) 5, a mirror (optical element) 3, a lens (collimator lens) 2, and a lens unit (condensing lens unit) 4.

Figure 3A:
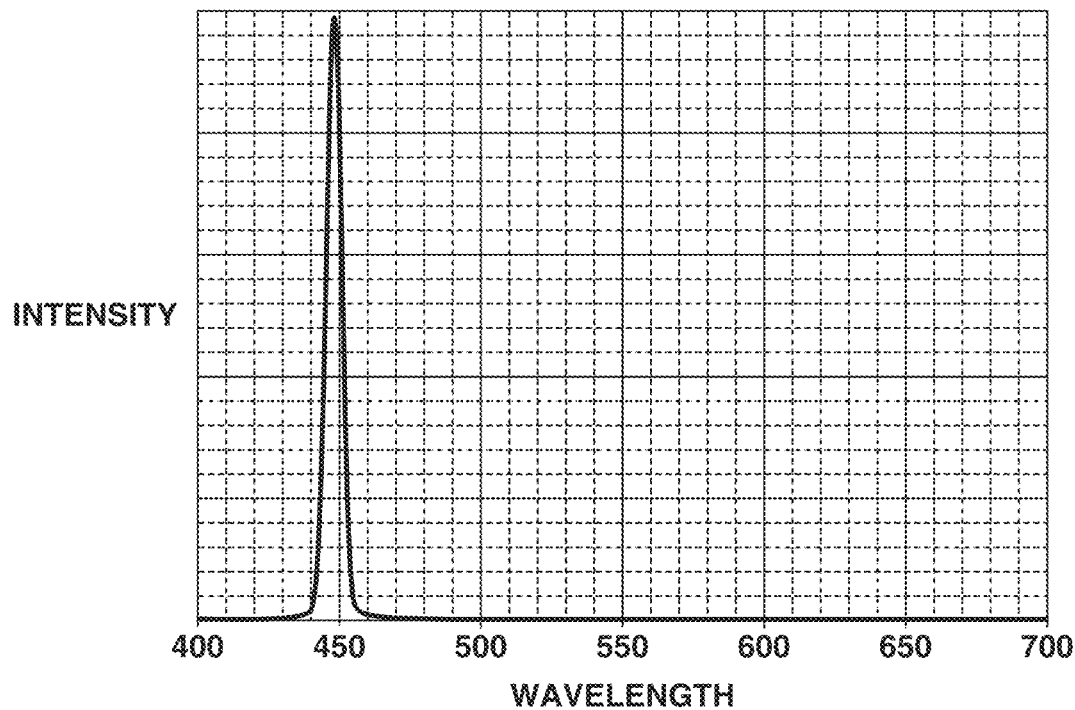
FIGS. 3A and 3B are diagrams illustrating the spectral characteristics of the light from a light source and fluorescent light used in the first exemplary embodiment of the present invention.

The light source 1 is an LD light source and, as illustrated in FIG. 3A, emits blue light having a peak (center) wavelength of approximated 448 nm. That is, in the exemplary embodiments of the present invention, the light from the light source 1 is blue light.

The fluorescent body 5 (see FIG. 2A) converts (modulates) blue light B1 into fluorescent light (converted light) having a wavelength different from that of the blue light B1 and emits the fluorescent light and non-converted light having the same wavelength as that of the blue light B1. As illustrated in FIG. 3B, the fluorescent light mainly contains green light and red light.

The mirror 3 includes a region 31 (a first region), which has the characteristic of guiding the blue light B1 to the fluorescent body 5, and a region 32 (a second region), which has the characteristic of guiding the fluorescent light and the non-converted light in a direction different from that of the light source 1.

The lens 2 is configured to convert (collimate) the blue light B1 into a parallel (collimated) beam of light.

The lens unit 4 is configured to have a positive refractive power to guide the blue light B1 to the fluorescent body 5 and also guide the fluorescent light and the non-converted light to the mirror 3. In the exemplary embodiments of the present invention, the lens unit 4 includes a total of three lenses.

Further, the light source apparatus according to the exemplary embodiments of the present invention includes any one of a dichroic mirror, a PBS, and an opening portion in the region 31.

The dichroic mirror is configured to guide light having the same wavelength as that of the blue light B1 to the fluorescent body 5 and also guide light having a wavelength different from that of the blue light B1 in a direction different from that of the light source 1. In other words, the dichroic mirror transmits light having the same wavelength as that of the light from the light source 1 and also reflects light having a wavelength different from that of the light emitted from the light source 1.

The PBS is configured to guide either one of p-polarized light and s-polarized light, each of which is linearly polarized light, to the fluorescent body 5 and also guide the other in a direction different from that of the light source 1. In other words, the PBS transmits one of p-polarized light and s-polarized light to the fluorescent body 5 and reflects in a direction different from that of the light source 1 the non-transmitted polarized light.

The specific configurations of the light source apparatus according to the exemplary embodiments of the present invention will be described in the following exemplary embodiments.

Figure 2A:
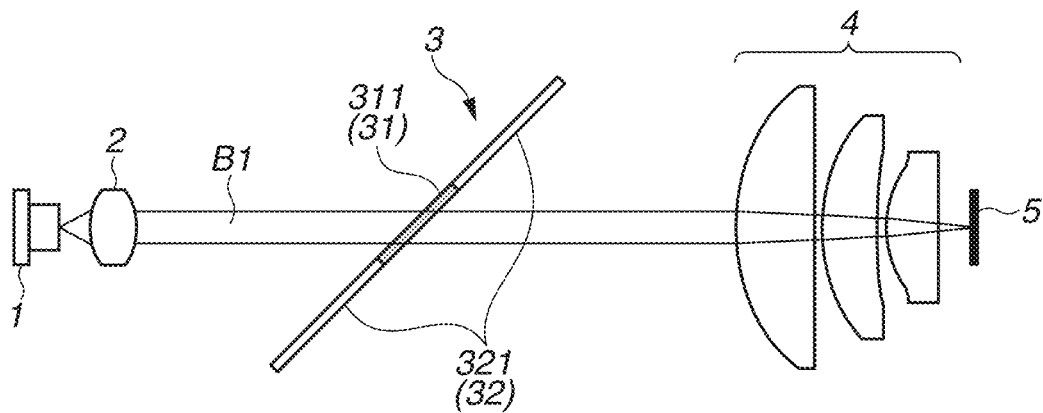
FIGS. 2A, 2B, and 2C are diagrams illustrating the configuration of a light source apparatus according to a first exemplary embodiment of the present invention.
Figure 2B:
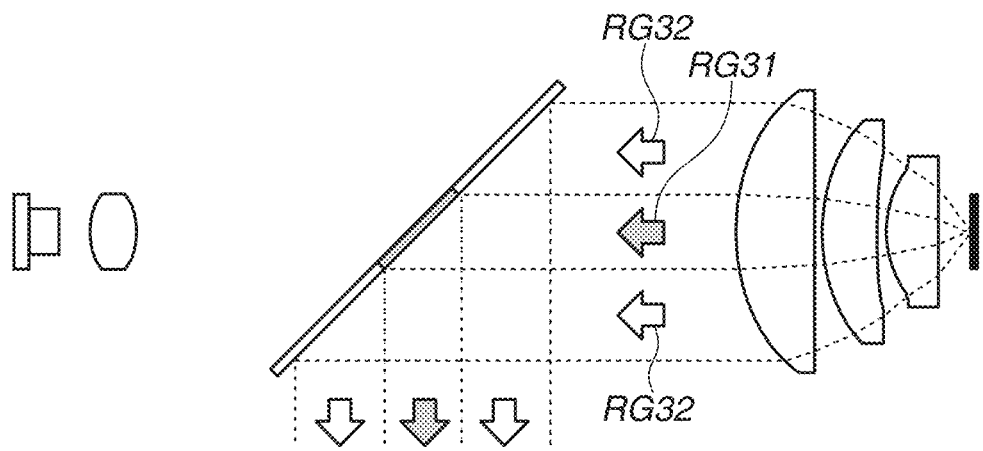
Figure 2C:
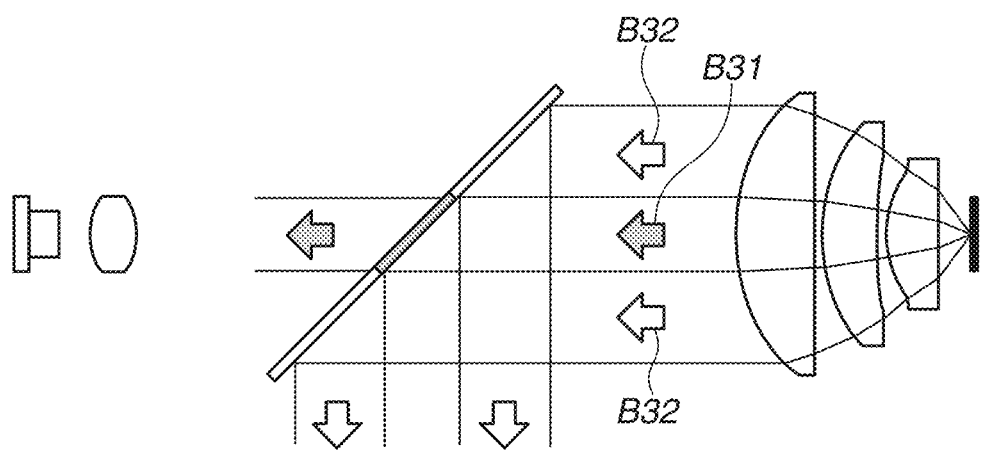
Figure 3B:
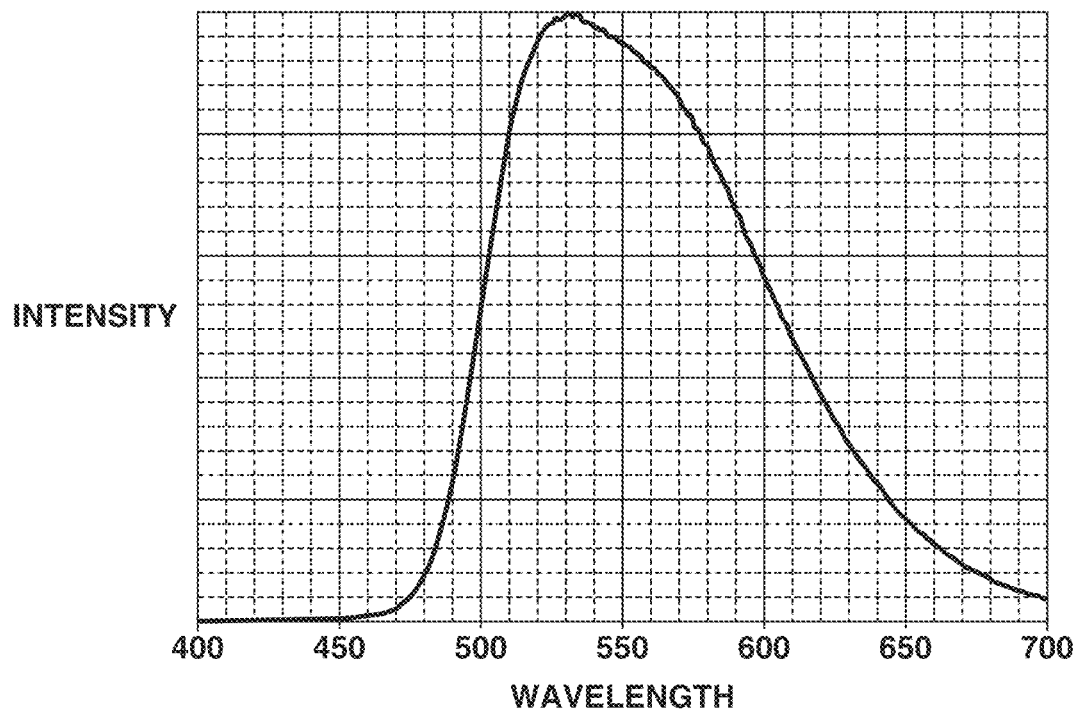

FIGS. 2A, 2B, and 2C are diagrams illustrating the configuration of a light source apparatus according to a first exemplary embodiment of the present invention.

The components, namely the light source 1, the lens 2, the mirror 3, the lens unit 4, and the fluorescent body 5, are arranged in a straight line starring from the light source 1 in the order mentioned above. That is, the fluorescent body 5 is provided in the direction of the blue light B1 traveling from the light source 1 to the mirror 3. Specifically, the lens 2 is provided between the light source 1 and the mirror 3, and the lens unit 4 is provided between the mirror 3 and the fluorescent body 5. In each exemplary embodiment of the present invention, a light source optical system includes the mirror 3 and the fluorescent body 5, and a light source apparatus includes the light source 1 and the light source optical system.

Figure 5A:
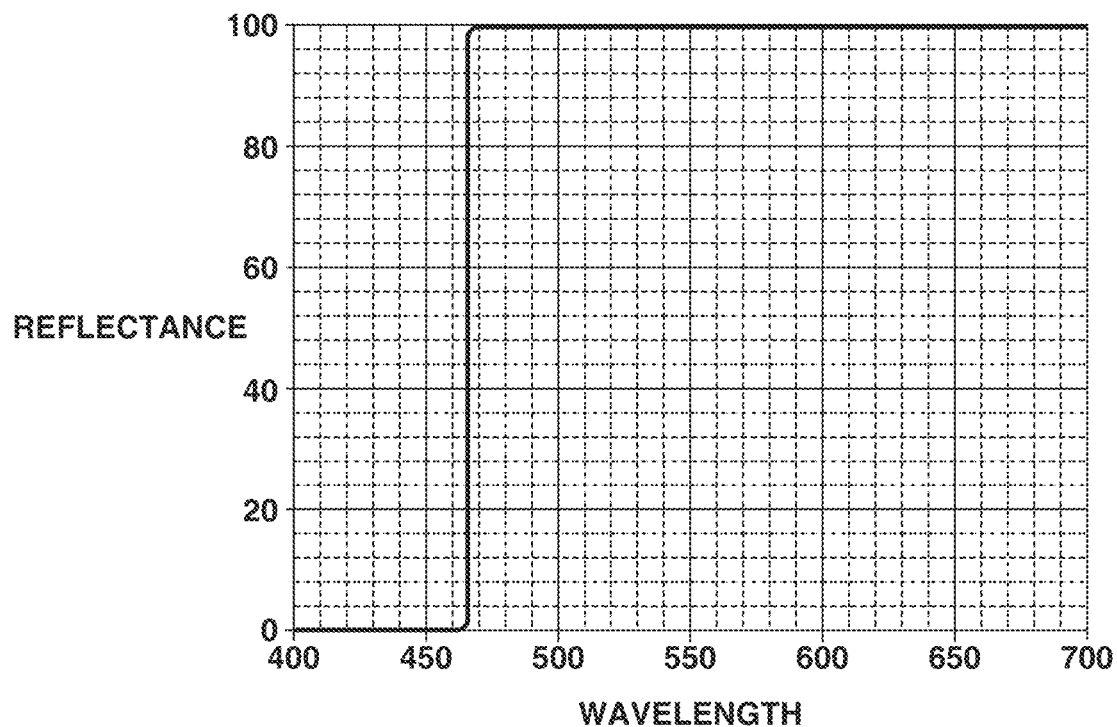
FIGS. 5A and 5B are diagrams illustrating the spectral reflection characteristics of the optical element used in the first exemplary embodiment of the present invention.

First, with reference to FIG. 2A, a description is given of the travel path (optical path) of the blue light B1 until it reaches the fluorescent body 5. The blue light B1 traveling from the light source 1 to the fluorescent body 5 is first collimated into approximately parallel light by the lens 2 and incident on the region 31 (first region) of the mirror 3. As illustrated in FIG. 2A, a dichroic mirror 311 is provided in the region 31, which has characteristics of transmitting the blue light B1 and reflecting visible light having a wavelength longer than that of the blue light B1. The reflectance characteristics of the dichroic mirror 311 are as illustrated in FIG. 5A. Thus, the blue light B1 incident on the region 31 passes through the region 31 and travels from the region 31 to the fluorescent body 5. The blue light B1 traveling from the region 31 to the fluorescent body 5 is condensed (focused) onto the surface of the fluorescent body 5 by the lens unit 4. To that end, the lens unit 4 has a positive refractive power. Then, the blue light B1 reaches the fluorescent body 5.

Next, a description is given of the process up until the fluorescent body 5 converts part of the blue light B1 into fluorescent light having a wavelength different from that of the blue light B1 and emits the fluorescent light and non-converted light having the same wavelength as that of the blue light B1. The fluorescent body 5 contains fluorescent material, such as yttrium aluminum garnet (YAG), as a main material and emits light having a spectrum as illustrated in FIG. 3B as fluorescent light, using the blue light B1 as excitation light. That is, in the present exemplary embodiment, the fluorescent light (converted light) contains green light and red light. Further, not all of the blue light B1 incident on the fluorescent body 5 is converted into fluorescent light. There is also non-converted light, which has not been converted while maintaining the same wavelength. That is, in the present exemplary embodiment, the non-converted light is blue light. The fluorescent body 5 is fixed to a mirror or metal. Thus, the fluorescent body 5 does not transmit any light and reflects all light.

Figure 4A:
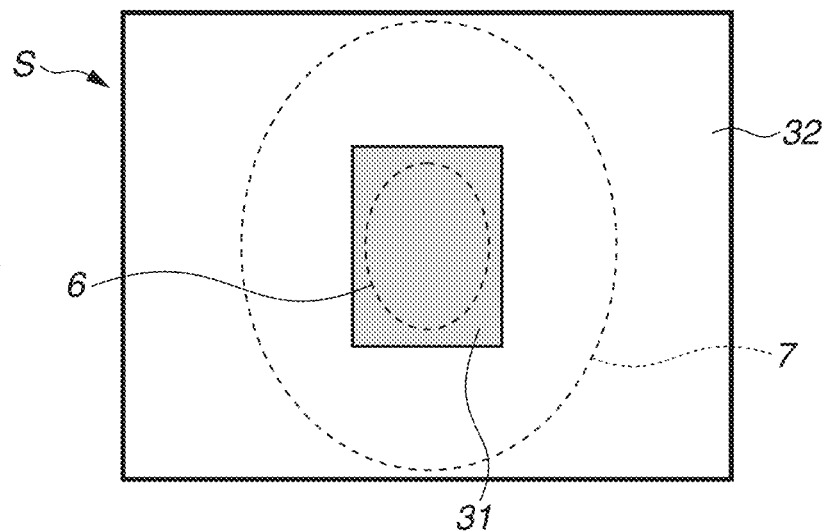
FIGS. 4A, 4B, and 4C are diagrams illustrating an optical element used in the first exemplary embodiment of the present invention.

Next, with reference to FIG. 2B, a description is given of the process up until the fluorescent light emitted from the fluorescent body 5 reaches the mirror 3 and is guided to an illumination optical system. When traveling from the fluorescent body 5 to the lens unit 4, the fluorescent light and the non-converted light are emitted in random directions without determined emission directions. To convert the fluorescent light and the non-converted light emitted in the random directions into parallel light and guide the parallel light from the fluorescent body 5 to the mirror 3, the lens unit 4 is placed between the fluorescent body 5 and the mirror 3. As illustrated in FIG. 4A, the lens unit 4 as described above makes the cross-sectional area of a cross section 7 larger than the cross-sectional area of a cross section 6. The cross section 7 is the cross section of a light beam emitted from the lens unit 4, on a plane S (a reference plane) placed parallel to the mirror 3 (a plane parallel to the plane of the paper in FIG. 4A). Further, the cross section 6 is the cross section of the blue light B1 on the plane S. As illustrated in FIG. 4A, it is understood that the cross section 6 is smaller than the region 31, and the blue light B1 is incident on the region 31. Alternatively, the plane S may be defined as a plane parallel to a straight line connecting the upper end and the lower end of the mirror 3.

Figure 4B:
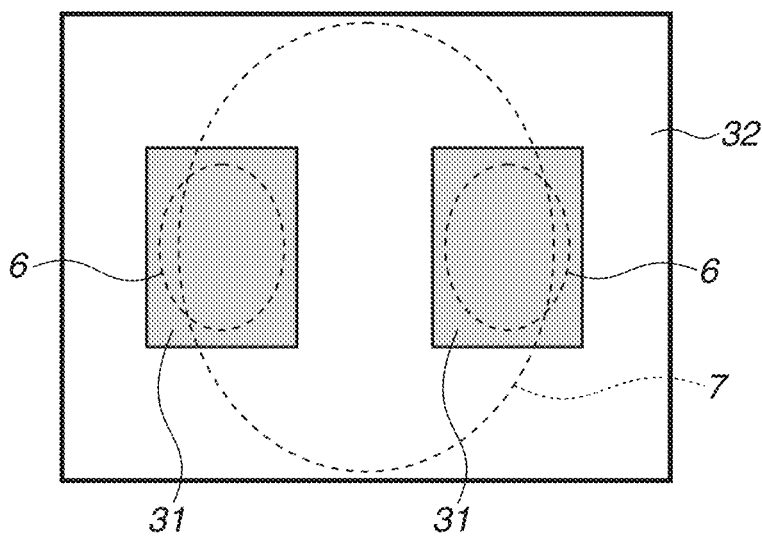
Figure 4C:
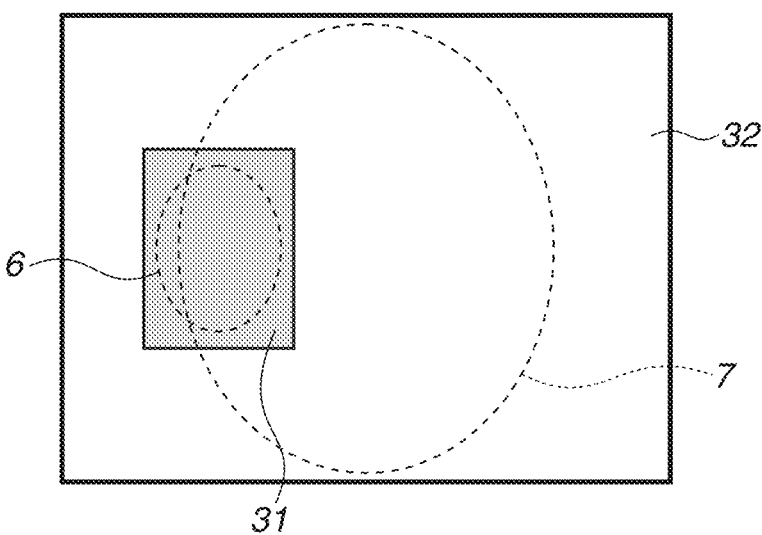

As illustrated in FIG. 4B, there may be a plurality of regions 31. In FIGS. 4A, 4B, and 4C, a region 31 indicates a region (a first projection region) where the region 31 of the mirror 3 is perpendicularly projected onto the plane S. A region 32 indicates a region where the region 32 of the mirror 3 is perpendicularly projected onto the plane S. Thus, in FIGS. 4A, 4B, and 4C, a region obtained by combining the regions 31 and 32 indicates a region (a second projection region) where the mirror 3 is perpendicularly projected onto the plane S.

Further, as illustrated in FIG. 4C, the region 31 may be provided to be located off of the center position of the mirror 3. Specifically, the center of gravity of the region where the region 31 of the mirror 3 is projected perpendicularly onto the plane S and the center of gravity of the region where the mirror 3 is perpendicularly projected onto the plane S are not concentric with each other. The centers of gravity are eccentric each other when the coordinates of the two centers of gravity do not coincide with each other. In other words, the light source apparatus (the mirror 3 and the lens unit 4) is configured such that a ray of light emitted from the fluorescent body 5 and passing along the optical axis of the lens unit 4 is incident on the region 32. Further, in other words, the region 31 is provided at a position shifted from the optical axis of the lens unit 4 or the extension of the optical axis.

Comparatively, the reflected light of the non-converted light has higher intensity at the center than another region. Thus, as illustrated in FIGS. 4B and 4C, the mirror 3 has at its center a region having the characteristic of reflecting the non-converted light. With such a configuration, it is possible to guide more non-converted light to the illumination optical system side. The same applies to the exemplary embodiments described below.

As described above, the blue light B1 is incident on the region 31 guided by the lens 2, and the fluorescent light and the non-converted light are incident on the region 31 and the region 32 guided by the lens unit 4. As illustrated in FIGS. 4A, 4B, and 4C, the region 31 is configured to have a cross-sectional area larger than that of the light beam of the blue light B1 on the plane S. Further, the region 32 is configured to have a cross-sectional area larger than the cross-sectional area 7 on the plane S.

Figure 5B:
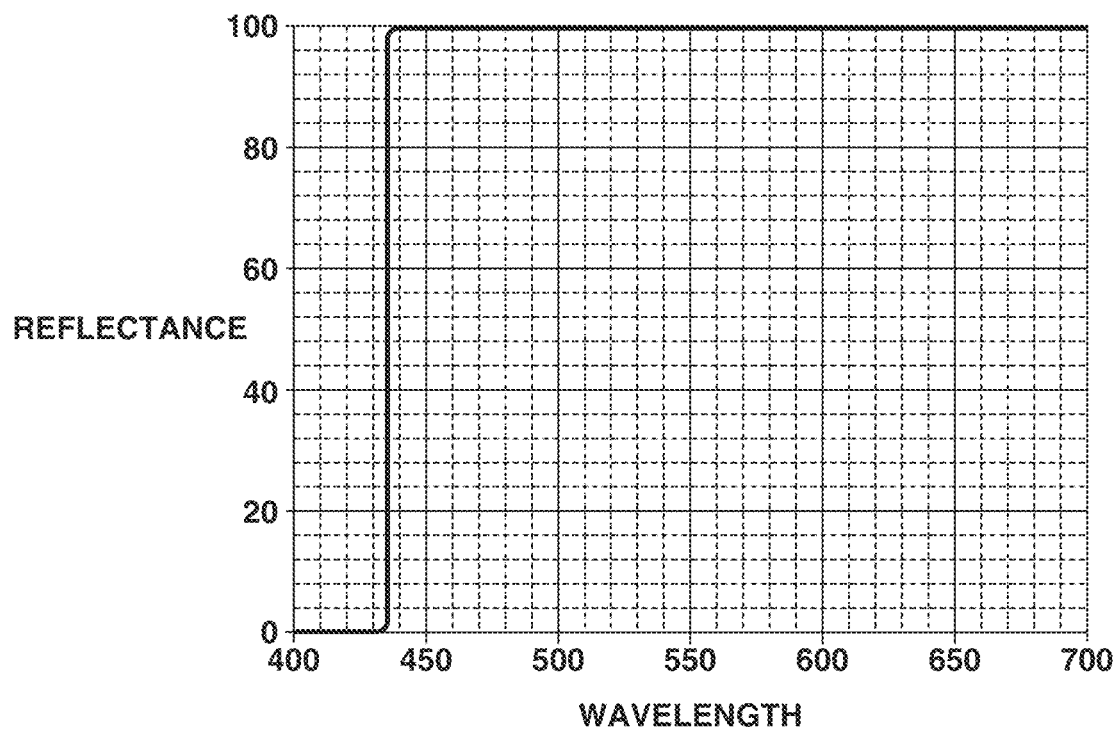

As illustrated in FIG. 2A, in the region 32, a dichroic mirror 321 is provided, which has the characteristic of reflecting visible light having a wavelength longer than 435 nm. The reflectance characteristics of the dichroic mirror 321 are as illustrated in FIG. 5B (100% reflectance for wavelengths 435 nm and higher). Among the fluorescent light, fluorescent light RG32, which is incident on the region 32, is visible light having a wavelength longer than 435 nm. Thus, the fluorescent light RG32 is reflected by the dichroic mirror 321 and guided in a direction different from that of the light source 1. Among the fluorescent light, fluorescent light RG31, which is incident on the region 31, is also visible light having a wavelength longer than that of the blue light B1, similarly to the fluorescent light RG32. Thus, the fluorescent light RG31 is guided in the direction different from that of the light source 1 by the dichroic mirror 311. In the present exemplary embodiment, the illumination optical system (not illustrated) is provided in the direction different from that of the light source 1.

Next, with reference to FIG. 2C, a description is given of the process up until the non-converted light reaches the mirror 3 and is guided to the illumination optical system or returns to the light source 1. As described above, the blue light B1 is incident on the region 31, and the fluorescent light and the non-converted light are incident on the region 31 and the region 32. As described above, in the region 32, the dichroic mirror 321 is provided, which has the characteristic of reflecting visible light having a wavelength longer than 435 nm.

Among the non-converted light, non-converted light B32, which is incident on the region 32, has the same wavelength as that of the blue light B1. Thus, the non-converted light B32 is reflected by the dichroic mirror 321 and guided in the direction different from that of the light source 1.

Among the non-converted light, non-converted light B31, which is incident on the region 31, also has the same wavelength as that of the blue light B1, similarly to the non-converted light B32. Thus, the non-converted light B31 passes through the region 31 guided by the dichroic mirror 311 and returns from the mirror 3 to the light source 1.

As described above, in the present exemplary embodiment, the light source apparatus is configured to guide the non-converted light B32, the fluorescent light RG31, and the fluorescent light RG32 to the illumination optical system provided in a direction different from that of the light source 1. Such a configuration enables the display of a color image. Further, conventionally, most of the non-converted light returns to the light source 1, whereas in the present exemplary embodiment, only part of the non-converted light is guided in the direction different from that of the light source 1. This can reduce the amount of non-converted light returning from the fluorescent body 5 to the light source 1 and increase the light emission efficiency of the light source 1, thereby projecting a brighter image. Further, in the present exemplary embodiment, it is possible to guide the non-converted light, which is blue light, to the illumination optical system. This eliminates the need to separately prepare a light source for emitting blue light in addition to the light source 1.

FIGS. 6A, 6B, and 6C are diagrams illustrating the configuration of a light source apparatus according to a second exemplary embodiment of the present invention. The light source apparatus according to the present exemplary embodiment includes the light source 1, the lens 2, the mirror 3, the lens unit 4, and the fluorescent body 5, similarly to the light source apparatus according to the first exemplary embodiment of the present invention.

The present exemplary embodiment is different from the first exemplary embodiment in the positional relationship between the light source 1 and the fluorescent body 5. In the first exemplary embodiment, a configuration has been exemplified in which the light source 1, the mirror 3, and the fluorescent body 5 are arranged in a straight line. In contrast, in the present exemplary embodiment, the light source 1, the mirror 3, and the fluorescent body 5 are not arranged in a straight line. That is, the fluorescent body 5 is provided in the direction in which the blue light B1 is reflected by the mirror 3.

First, with reference to FIG. 6A, a description is given of the process up until the blue light B1 reaches the fluorescent body 5. The process up until the blue light B1 is input to the region 31 of the mirror 3 is similar to that of the first exemplary embodiment. In the present exemplary embodiment, however, as illustrated in FIG. 6A, in the region 31, a dichroic mirror 312 is provided, which has reflectance characteristics of reflecting the blue light B1 and transmitting visible light having a wavelength longer than that of the blue light B1. The reflectance characteristics of the dichroic mirror 312 are as illustrated in FIG. 7A. Thus, the blue light B1 incident on the region 31 is reflected by the dichroic mirror 312 and guided to the fluorescent body 5. Then, the blue light B1 reaches the fluorescent body 5.

The present exemplary embodiment is similar to the first exemplary embodiment in that the fluorescent body 5 converts part of the blue light B1 into fluorescent light having a wavelength different from that of the blue light B1 and emits the fluorescent light and non-converted light having the same wavelength as that of the blue light B1.

Next, with reference to FIG. 6B, a description is given of the process up until the fluorescent light emitted from the fluorescent body 5 reaches the mirror 3 and is guided to an illumination optical system. The process up until the fluorescent light travels from the lens unit 4 to the mirror 3 is similar to that of the first exemplary embodiment. As illustrated in FIG. 6A, in the region 32, a transmission member 322 is provided, which transmits light regardless of the wavelength. The characteristics of the transmission member 322 are as illustrated in FIG. 7B. Among the fluorescent light, fluorescent light RG31, which is incident on the region 31, has a wavelength longer than that of the blue light B1. Thus, the fluorescent light RG31 passes through the region 31. Further, among the fluorescent light, fluorescent light RG32, which is incident on the region 32, also passes through the region 32 and is guided to the illumination optical system.

Figure 8A:
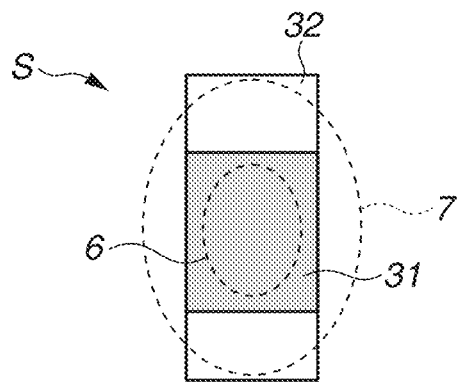
FIGS. 8A and 8B are diagrams illustrating other forms of the optical element used in the second exemplary embodiment of the present invention.
Figure 8B:
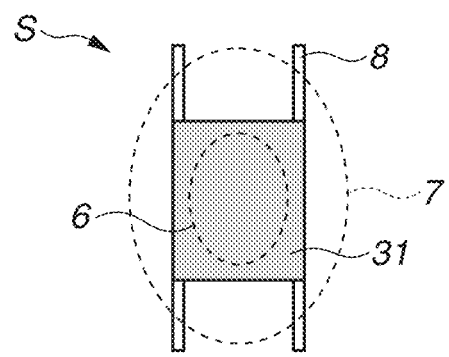

FIGS. 8A and 8B are diagrams illustrating variations of the mirror 3. FIG. 8A illustrates a configuration in which the transmission member 322 has the same width as that of the dichroic mirror 312. In the present exemplary embodiment, even the mirror 3 having the configuration illustrated in FIG. 8A can reduce the amount of non-converted light returning from the fluorescent body 5 to the light source 1. Further, in the configuration illustrated in FIG. 8A, a projection area where the mirror 3 is perpendicularly projected onto a plane S is smaller than those of the configurations illustrated in FIGS. 4A, 4B, and 4C. That is, the configuration illustrated in FIG. 8A can make the size of the mirror 3 smaller. Further, the transmission member 322 is made not of a glass member but of a resin member, whereby it is possible to reduce the surface reflection and further increase the light use efficiency.

Further, as illustrated in FIG. 8B, an optical member is provided only in the region 31. In other words, an opening portion is provided in the region 32. That is, the transmission member 322 may not be provided, but only the dichroic mirror 312 may be provided. In other words, the cross-sectional area of a cross section 7 may be larger than the area of region 31 illustrated in FIG. 8B. The cross section 7 is the cross section of a light beam emitted from the lens unit 4 on the plane S placed parallel to the dichroic mirror 312. Further, the area of region 31 illustrated in FIG. 8B is an area of a projected region where the dichroic mirror 312 is perpendicularly projected onto the plane S. Alternatively, the plane S parallel to the dichroic mirror 312 may be defined as a plane parallel to a straight line connecting the upper end and the lower end of the dichroic mirror 312.

In the configuration illustrated in FIG. 8B, the dichroic mirror 312 is fixed with supporting bars 8. Further, in the configuration illustrated in FIG. 8B, an area that needs masking in vapor deposition is limited only to the area of the dichroic mirror 312. This can reduce the manufacturing cost.

Next, with reference to FIG. 6C, a description is given of the process up until the non-converted light reaches the mirror 3 and is guided to the illumination optical system or returns to the light source 1. The process up until the non-converted light travels from the lens unit 4 to the mirror 3 is similar to that of the first exemplary embodiment. Non-converted light B32, which is incident on the region 32, passes through the region 32 and is guided to the illumination optical system similarly to the fluorescent light RG32. On the other hand, non-converted light B31, which is incident on the region 31, is reflected by the dichroic mirror 312, which has reflectance characteristics of reflecting the blue light B1 and transmitting visible light having a wavelength longer than that of the blue light B1. The non-converted light B31 reflected by the dichroic mirror 312 returns from the region 31 to the light source 1.

As described above, also in the present exemplary embodiment, similarly to the first exemplary embodiment, part of the non-converted light is guided in a direction different from that of the light source 1. This can reduce the amount of non-converted light returning from the fluorescent body 5 to the light source 1 and increase the light emission efficiency of the light source 1, thereby projecting a brighter image.

FIGS. 9A, 9B, and 9C are diagrams illustrating the configuration of a light source apparatus according to a third exemplary embodiment of the present invention.

The present exemplary embodiment is different from the first exemplary embodiment in that the polarization characteristics of an LD are used, and the mirror 3 has PBS characteristics.

In FIGS. 9A, 9B, and 9C, the surface normal of the mirror 3 is within the plane of the paper. Thus, polarized light that vibrates in a direction perpendicular to the plane of the paper is defined as s-polarized light, and linearly polarized light that vibrates within the plane of the paper is defined as p-polarized light. S-polarized light is illustrated as "●●●", and p-polarized light is illustrated as "| | |". Further, polarized light containing p-polarized light and s-polarized light is illustrated as having both "●●●" and "| | |" together so that "●●●" and "| | |" are adjacent to each other. The polarized light containing p-polarized light and s-polarized light is light in which a p-polarized component and an s-polarized light component are combined together in certain proportions. Thus, the polarized light containing p-polarized light and s-polarized light refers to linearly polarized light, circularly polarized light, or elliptically polarized light that contains p-polarized light and s-polarized light. Further, non-polarized light is illustrated as "|●|". The non-polarized light is light in which linearly polarized light, circularly polarized light, and elliptically polarized light are mixed together.

The light source 1 in the present exemplary embodiment is an LD and emits p-polarized light B1$p$, which is blue light having a wavelength of 448 nm and is also p-polarized light. That is, in the present exemplary embodiment, the light from the light source 1 is the p-polarized light B1$p$.

First, with reference to FIG. 9A, a description is given of the process up until the p-polarized light B1$p$ reaches the fluorescent body 5. The process until the p-polarized light B1$p$ is incident on the region 31 of the mirror 3 is similar to that of the first exemplary embodiment. In the present exemplary embodiment, however, in the region 31, a PBS 313 is provided, which has the characteristic of, transmitting p-polarized light and reflecting s-polarized light with respect to blue light. Thus, since the p-polarized light B1$p$ incident on the region 31 is p-polarized light, the p-polarized light B1p passes through the region 31 and is guided to the fluorescent body 5. Then, the polarized light B1p reaches the fluorescent body 5.

Next, a description is given of the process up until the fluorescent body 5 converts part of the p-polarized light B1p into fluorescent light having a wavelength different from that of the p-polarized light B1p and emits the fluorescent light and non-converted light having the same wavelength as that of the p-polarized light B1p.

The fluorescent body 5 converts part of the p-polarized light B1p into fluorescent light that is different in wavelength from the p-polarized light B1p and is in an non-polarized state where the polarization direction of the fluorescent light is disturbed. Further, the fluorescent body 5 has the property of emitting the rest of the p-polarized light B1p that has not been converted into fluorescent light, as non-polarized light by randomizing also the polarization direction of the rest of the p-polarized light B1p. Thus, in the present exemplary embodiment, fluorescent light RG31, fluorescent light RG32, non-converted light B31, and non-converted light B32 travel from the fluorescent body 5 to the mirror 3 as non-polarized light.

Figure 10:
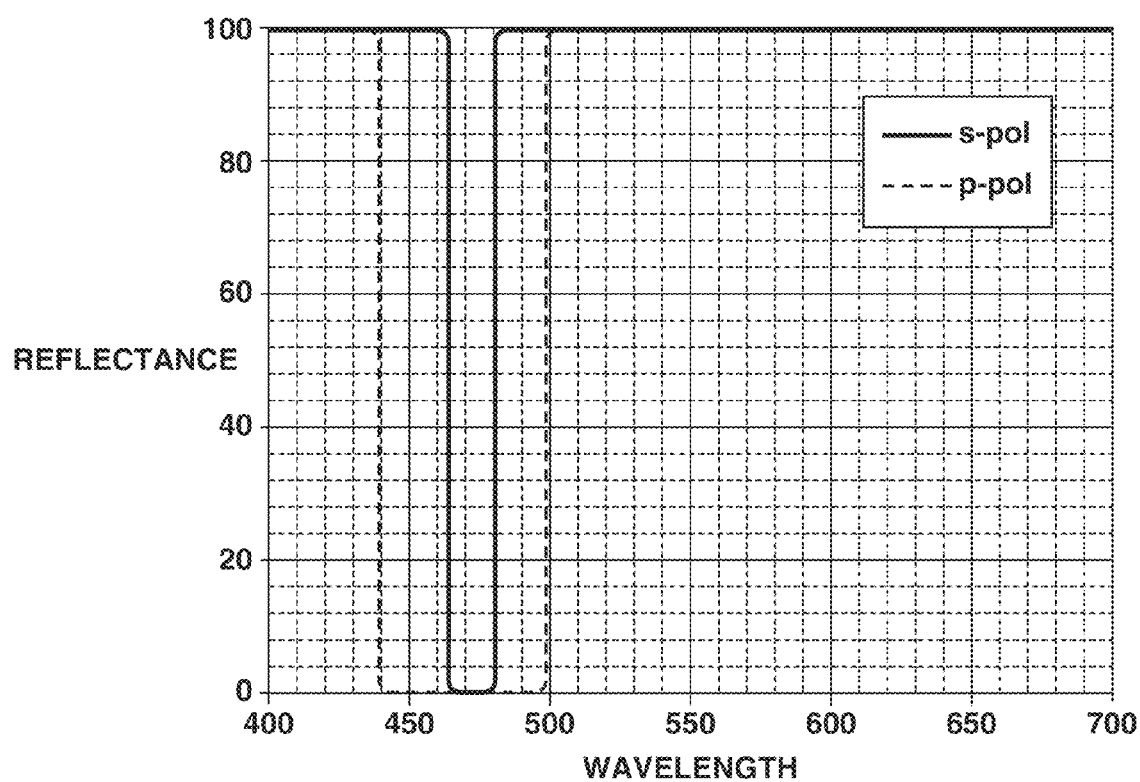
FIG. 10 is a diagram illustrating the spectral reflection characteristics of a first region of an optical element used in the third exemplary embodiment of the present invention.

Next, with reference to FIG. 9B, a description is given of the process up until the fluorescent light emitted from the fluorescent body 5 reaches the mirror 3 and is guided to an illumination optical system. The process until the fluorescent light travels from the lens unit 4 to the mirror 3 is similar to that of the first exemplary embodiment. As described above, in the region 31, the PBS 313 is provided, which has the characteristic of, transmitting p-polarized light and reflecting s-polarized light with respect to blue light. Further, the PBS 313 also has the characteristic of reflecting light having a wavelength longer than that of blue light. The reflectance characteristics of the PBS 313 are as illustrated in FIG. 10. Thus, among the fluorescent light, the fluorescent light RG31 incident on the region 31 is reflected by the PBS 313 and guided to the illumination optical system provided in a direction different from that of the light source 1. On the other hand, in the region 32, a mirror 323 is provided, which reflects visible light regardless of the wavelength. Thus, among the fluorescent light, the fluorescent light RG32 incident on the region 32 is reflected by the mirror 323 and guided to the illumination optical system similarly to the fluorescent light RG31.

Next, with reference to FIG. 9C, a description is given of the process up until the non-converted light, of which the wavelength has not been converted by the fluorescent body 5, reaches the mirror 3 and is guided to the illumination optical system or returns to the light source 1. The process until the non-converted light travels from the lens unit 4 to the mirror 3 is similar to that of the first exemplary embodiment. As described above, in the region 31, the PBS 313 is provided, which has the characteristic of transmitting p-polarized light and reflecting s-polarized light with respect to blue light. Alternatively, the PBS 313 may have the characteristic of transmitting p-polarized light with respect to blue light and reflecting s-polarized light including also visible light other than blue light. Thus, among the non-converted light, p-polarized light B31p in the non-converted light B31 incident on the region 31 passes through the region 31 and returns to the light source 1. On the other hand, among the non-converted light B31, s-polarized light B31s is reflected by the PBS 313 and guided to the illumination optical system provided in the direction different from that of the light source 1. Further, among the non-converted light, the non-converted light B32 incident on the region 32 is guided to the illumination optical system by the mirror 323, which reflects visible light regardless of the wavelength, similarly to the s-polarized light B31s.

As described above, in the present exemplary embodiment, it is possible to guide the s-polarized light B31s, which is part of the non-converted light B31 incident on the region 31, and the non-converted light B32 incident on the region 32, in a direction different from that of the light source 1. Thus, in the present exemplary embodiment, it is possible to guide more blue light to the illumination optical system and project a brighter image than in the first and second exemplary embodiments.

Figure 11A:
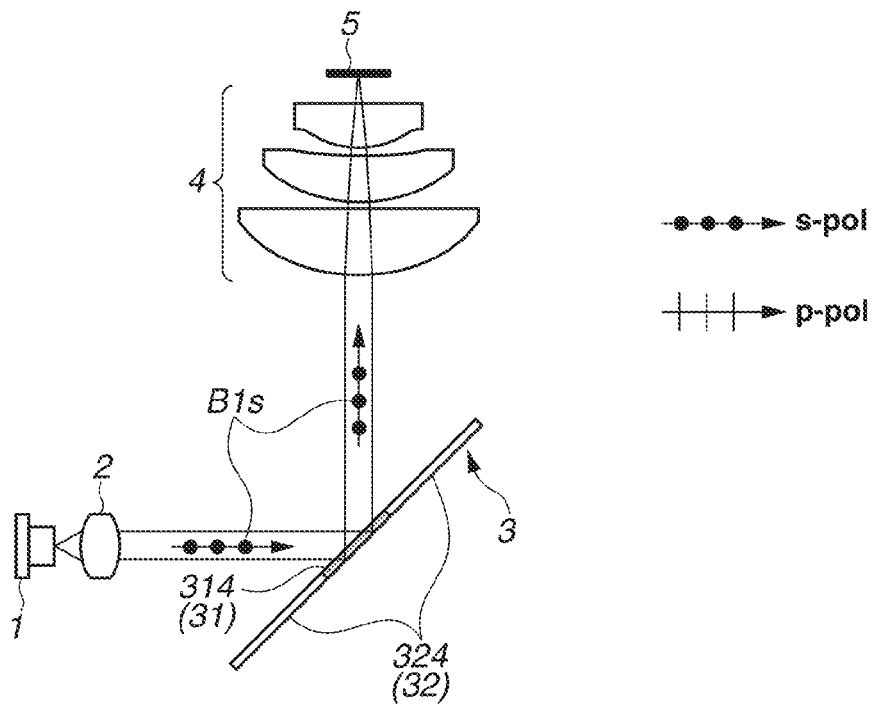
FIGS. 11A, 11B, and 11C are diagrams illustrating the configuration of a light source apparatus according to a fourth exemplary embodiment of the present invention.
Figure 11B:
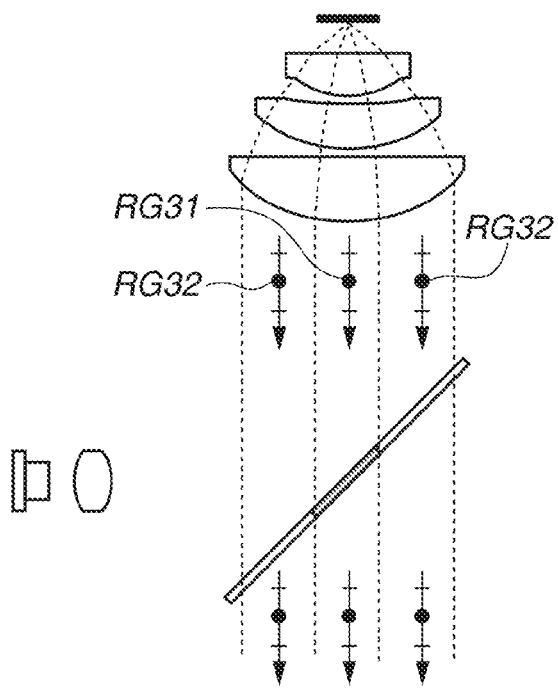
Figure 11C:
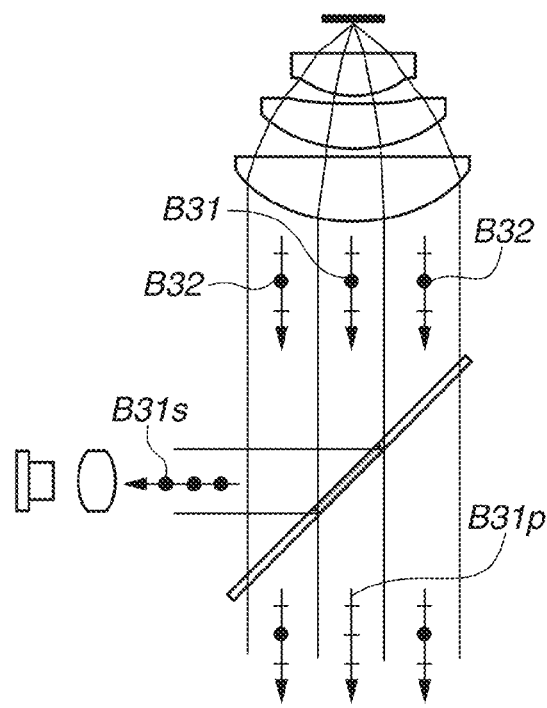

FIGS. 11A, 11B, and 11C are diagrams illustrating the configuration of a light source apparatus according to a fourth exemplary embodiment of the present invention.

The present exemplary embodiment is different from the third exemplary embodiment in the positional relationship between the light source 1 and the fluorescent body 5. More specifically, in the third exemplary embodiment, the light source 1, the mirror 3, and the fluorescent body 5 are arranged in a straight line. In contrast, in the present exemplary embodiment, the light source 1, the mirror 3, and the fluorescent body 5 are not arranged in a straight line. Further, the light source 1 in the above exemplary embodiment emits the p-polarized light B1p, which is blue light having a wavelength of 448 nm and is also p-polarized light. In contrast, the light source 1 in the present exemplary embodiment emits s-polarized light B1s, which is blue light having a wavelength of 448 nm and is also s-polarized light. That is, in the present exemplary embodiment, the light from the light source 1 is the s-polarized light B1s.

Figure 12:
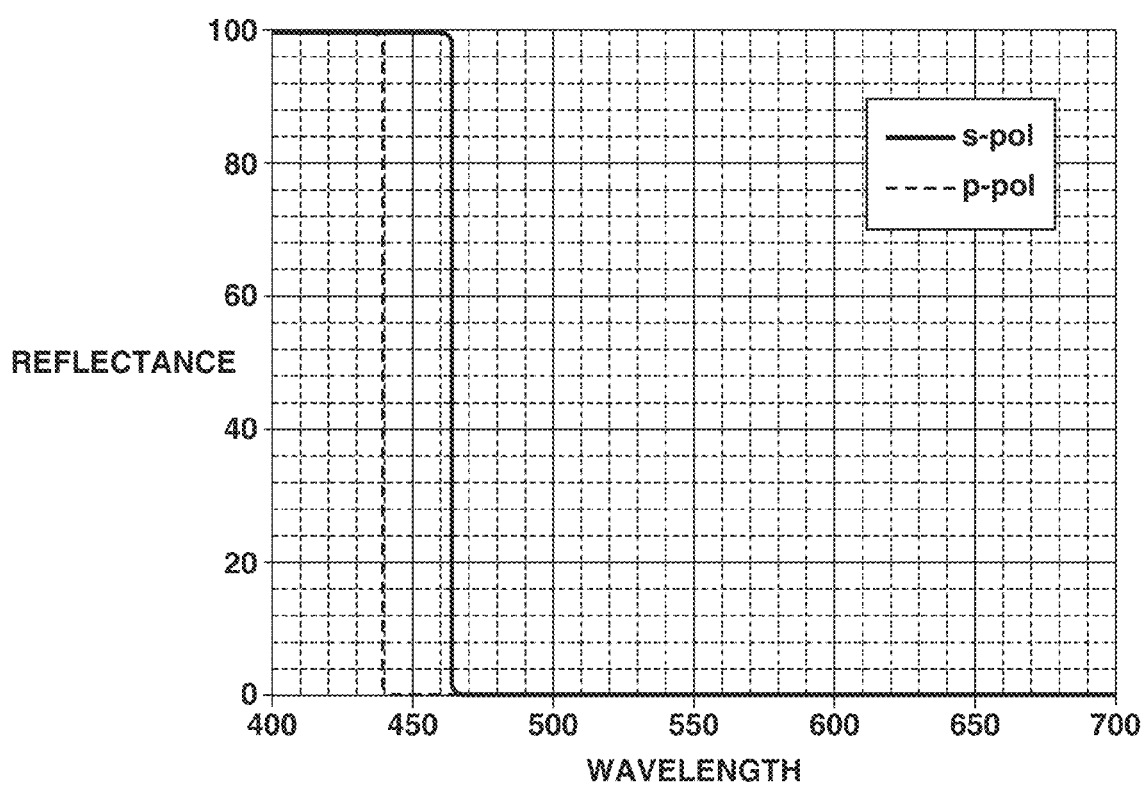
FIG. 12 is a diagram illustrating the spectral reflection characteristics of a first region of an optical element used in the fourth exemplary embodiment of the present invention.

First, with reference to FIG. 11A, a description is given of the process up until the polarized light B1s reaches the fluorescent body 5. The process until the polarized light B1s is incident on the region 31 of the mirror 3 is similar to that of the third exemplary embodiment. In the region 31, a PBS 314 is provided, which has the characteristic of transmitting p-polarized light and reflecting s-polarized light with respect to blue light. Further, the PBS 314 also has the characteristic of transmitting visible light having a wavelength longer than that of blue light. The reflectance characteristics of the PBS 314 are as illustrated in FIG. 12. Since the s-polarized light B1s incident on the region 31 is s-polarized light, the s-polarized light B1s is reflected by the PBS 314 and guided to the fluorescent body 5. Then, the s-polarized light B1s reaches the fluorescent body 5.

The present exemplary embodiment is similar to the third exemplary embodiment in that the fluorescent body converts part of the s-polarized light B1s into fluorescent light having a wavelength different from that of the s-polarized light B1s and emits the fluorescent light and non-converted light having the same wavelength as that of the s-polarized light B1s.

Next, with reference to FIG. 11B, a description is given of the process up until the fluorescent light emitted from the fluorescent body 5 reaches the mirror 3 and is guided to an illumination optical system. The process until the fluorescent light travels from the lens unit 4 to the mirror 3 is similar to that of the third exemplary embodiment. As described above, the PBS 314 has the characteristic of transmitting p-polarized light and reflecting s-polarized light with respect to blue light and also has the characteristic of transmitting visible light having a wavelength longer than that of blue light. Thus, among the fluorescent light, fluorescent light RG31, which is incident on the region 31, passes through the region 31 and is guided to the illumination optical system. On the other hand, in the region 32, a transmission member 324 is provided, which transmits visible light regardless of the wavelength. Thus, among the fluorescent light, fluorescent light RG32, which is incident on the region 32, also passes through the region 32 and is guided to the illumination optical system similarly to the fluorescent light RG31.

Next, with reference to FIG. 11C, a description is given of the process up until the non-converted light of which the wavelength has not been converted by the fluorescent body 5 reaches the mirror 3 and is guided to the illumination optical system or returns to the light source 1. The process until the non-converted light travels from the lens unit 4 to the mirror 3 is similar to that of the third exemplary embodiment. As described above, in the region 31, the PBS 314 is provided, which has the characteristic of transmitting p-polarized light and reflecting s-polarized light with respect to blue light. The non-converted light travels from the lens unit 4 to the mirror 3 guided by the lens unit 4 so that the non-converted light is incident on the region 31 and the region 32 as parallel light. Thus, among non-converted light B31, which is incident on the region 31, p-polarized light B31$p$ passes through the region 31 and is guided to the illumination optical system. On the other hand, among the non-converted light B31, s-polarized light B31$s$ is reflected by the PBS 314 and returns to the light source 1. Further, among the non-converted light, non-converted light B32, which is incident on the region 32, is guided to the illumination optical system by the transmission member 324, which transmits visible light regardless of the wavelength.

As described above, in the present exemplary embodiment, it is possible to guide the p-polarized light B31$p$, which is part of the non-converted light B31 incident on the region 31, and the non-converted light B32 incident on the region 32 in a direction different from that of the light source 1. Thus, in the present exemplary embodiment, it is possible to guide a more amount of blue light to the illumination optical system and project a brighter image than in the first and second exemplary embodiments.

Figure 13A:
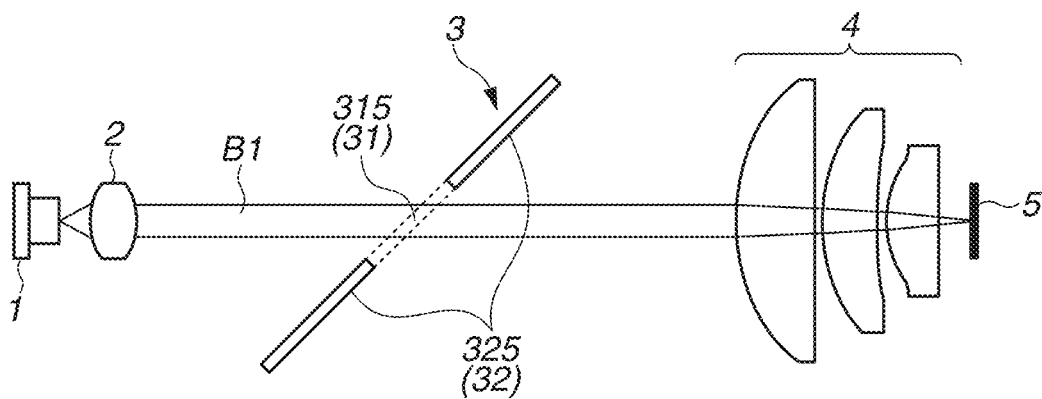
FIGS. 13A, 13B, and 13C are diagrams illustrating the configuration of a light source apparatus according to a fifth exemplary embodiment of the present invention.
Figure 13B:
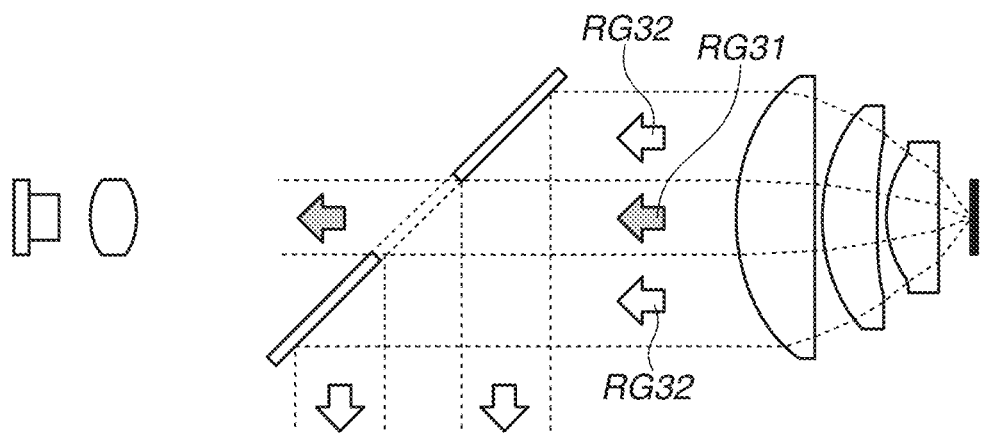
Figure 13C:
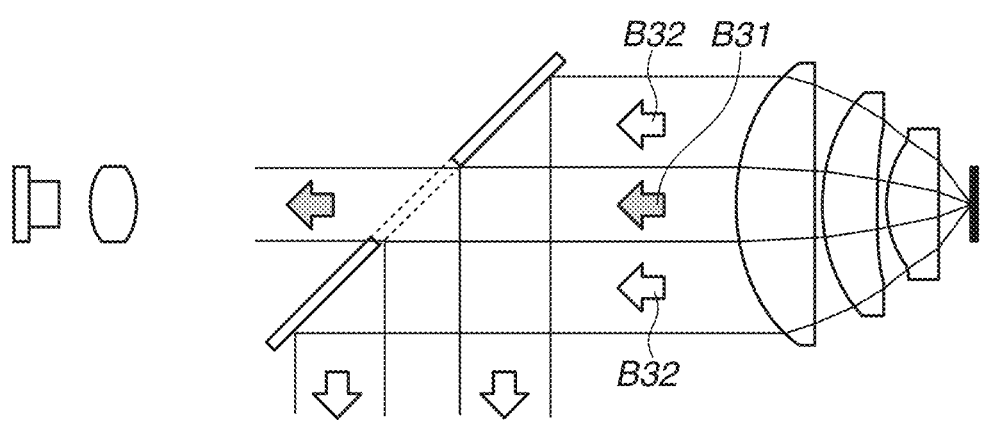

FIGS. 13A, 13B, and 13C are diagrams illustrating the configuration of a light source apparatus according to a fifth exemplary embodiment of the present invention. The present exemplary embodiment is characterized in that an opening portion 315 is provided in the region 31.

First, with reference to FIG. 13A, a description is given of the process up until the blue light B1 reaches the fluorescent body 5. The process until the blue light B1 is incident on the region 31 of the mirror 3 is similar to that of the first exemplary embodiment. Since the opening portion 315 is provided in the region 31 as described above, the blue light B1 passes through the region 31 and is guided to the fluorescent body 5. Then, the blue light B1 reaches the fluorescent body 5.

The present exemplary embodiment is similar to the first exemplary embodiment in that the fluorescent body 5 converts part of the blue light B1 into fluorescent light having a wavelength different from that of the blue light B1 and emits the fluorescent light and non-converted light having the same wavelength as that of the blue light B1.

Next, with reference to FIG. 13B, a description is given of the process up until the fluorescent light emitted from the fluorescent body 5 reaches the mirror 3 and is guided to an illumination optical system. The process until the fluorescent light travels from the lens unit 4 to the mirror 3 is similar to that of the first exemplary embodiment. In the region 32, a dichroic mirror 325 is provided, which has the characteristic of reflecting visible light having a wavelength longer than 435 nm similarly to the dichroic mirror 321 in the first exemplary embodiment. Thus, among the fluorescent light, fluorescent light RG32, which is incident on the region 32, is reflected by the dichroic mirror 325 and guided to the illumination optical system. On the other hand, fluorescent light RG31, which is incident on the region 31, passes through the opening portion 315 and returns to the light source 1.

Next, with reference to FIG. 13C, a description is given of the process up until the non-converted light, of which the wavelength has not been converted by the fluorescent body 5, reaches the mirror 3 and is guided to the illumination optical system or returns to the light source 1. The process until the non-converted light travels from the lens unit 4 to the mirror 3 is similar to that of the third exemplary embodiment. Among the non-converted light, non-converted light B32, which is incident on the region 32, is reflected by the dichroic mirror 325 and guided to the illumination optical system. On the other hand, among the non-converted light, non-converted light B31, which is incident on the region 31, passes through the opening portion 315 and returns to the light source 1.

As described above, in the present exemplary embodiment, it is possible to reduce the amount of non-converted light returning from the fluorescent body 5 to the light source 1, without providing an optical member such as a dichroic mirror or a PBS in the region 31.

Figure 14A:
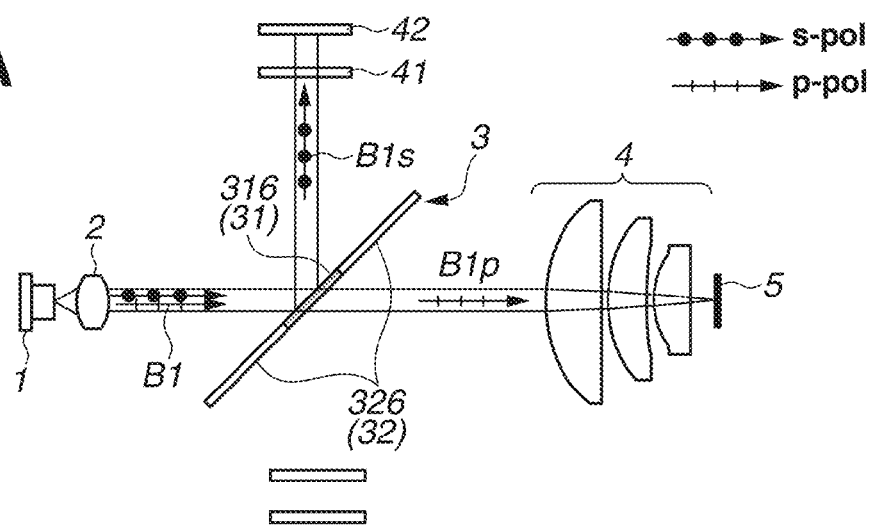
FIGS. 14A, 14B, and 14C are diagrams illustrating the configuration of a light source apparatus according to a sixth exemplary embodiment of the present invention.
Figure 14B:
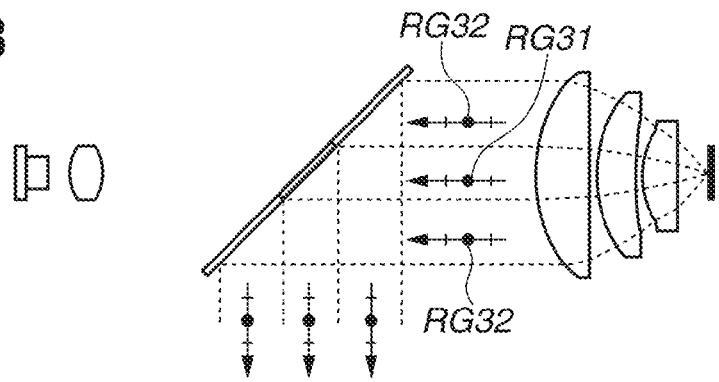
Figure 14C:
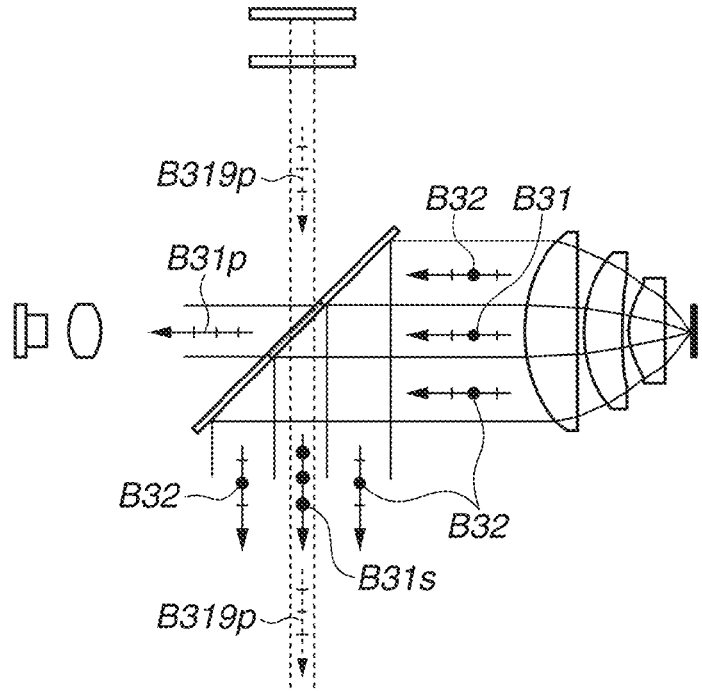

FIGS. 14A, 14B, and 14C are diagrams illustrating the configuration of a light source apparatus according to a sixth exemplary embodiment of the present invention. In the present exemplary embodiment, the light source 1, the element 3, and the fluorescent body 5 are arranged in a straight line, similarly to the first exemplary embodiment. Additionally, in the present exemplary embodiment, a quarter-$\lambda$ plate 41 and a mirror 42 are provided in a direction different from that of the fluorescent body 5. Further, in the present exemplary embodiment, the blue light B1, which is the light from the light source 1, is polarized light containing p-polarized light and s-polarized light such that the main component of the polarized light is s-polarized light B1$s$, and p-polarized light B1$p$ is slightly added to the polarized light.

First, with reference to FIG. 14A, a description is given of the process up until, among the blue light B1, the p-polarized light B1$p$ reaches the fluorescent body 5, and the s-polarized light B1$s$ is guided in the direction different from that of the fluorescent body 5. The process until the blue light B1 is incident on the region 31 is similar to that of the first exemplary embodiment. In the present exemplary embodiment, however, unlike the first exemplary embodiment, in the region 31, a PBS 316 is provided, which has a characteristic similar to that of the third exemplary embodiment. Thus, among the blue light B1 incident on the region 31, the p-polarized light B1$p$, which is p-polarized light, passes through the region 31 and is guided to the fluorescent body 5. Then, the p-polarized light B1$p$ reaches the fluorescent body 5. On the other hand, among the blue light B1, the s-polarized light B1$s$, which is s-polarized light, is reflected by the region 31 and guided in the direction different from that of the fluorescent body 5. In the present exemplary embodiment, the quarter-$\lambda$ plate 41 and the mirror 42 are provided in the direction different from that of the fluorescent body 5.

The present exemplary embodiment is similar to the third exemplary embodiment in that the fluorescent body 5 converts part of the p-polarized light B1$p$ into fluorescent light having a wavelength different from that of the p-polarized light B1$p$ and emits the fluorescent light and non-converted light having the same wavelength as that of the p-polarized light B1$p$.

Next, with reference to FIG. 14B, a description is given of the process up until the fluorescent light emitted from the fluorescent body 5 reaches the mirror 3 and is guided to an illumination optical system. The process until the fluorescent light travels from the lens unit 4 to the mirror 3 is similar to that of the third exemplary embodiment. In the region 32, a mirror 326 is provided, which has a characteristic similar to that of the mirror 323. The PBS 316, which is provided in the region 31, has a characteristic similar to that of the PBS 313. Thus, the process until fluorescent light RG31, fluorescent light RG32, and non-converted light B32 are guided to the illumination optical system is similar to that of the third exemplary embodiment. Further, also the process until p-polarized light B31$p$ passes through the region 31 and returns to the light source 1 is similar to that of the third exemplary embodiment. Further, also the process until s-polarized light B31$s$ is guided in a direction different from that of the light source 1 is similar to that of the third exemplary embodiment.

Next, with reference to FIG. 14C, a description is given of the process up until the s-polarized light B1$s$ guided in the direction different from that of the fluorescent body 5 returns to the mirror 3 and is guided to the illumination optical system. The quarter-$\lambda$ plate 41 and the mirror 42 are provided in the direction different from the direction from the mirror 3 toward the fluorescent body 5, and the quarter-$\lambda$ plate 41 is provided between the mirror 3 and the mirror 42.

The quarter-$\lambda$ plate 41 changes the polarization direction of the polarized light B1$s$, which is light to be guided in the direction different from the direction from the mirror 3 toward the fluorescent body 5, with respect to the blue light B1.

The mirror 42 guides the light of which the polarization direction has been changed by the quarter-$\lambda$ plate 41, again to the quarter-$\lambda$ plate 41. Then, the mirror 42 also guides the light of which the polarization direction has been changed again by the quarter-$\lambda$ plate 41, in the direction from the quarter-$\lambda$ plate 41 toward the mirror 3.

More specifically, the s-polarized light B1$s$ is incident on the quarter-$\lambda$ plate 41, and the polarization direction of the s-polarized light B1$s$ is changed by the quarter-$\lambda$ plate 41. Then, the s-polarized light B1$s$ is reflected by the mirror 42 and incident on the quarter-$\lambda$ plate 41 again, and the polarization direction of the s-polarized light B1$s$ is changed by the quarter-$\lambda$ plate 41 again. As described above, the s-polarized light B1$s$ is incident on the quarter-$\lambda$ plate 41 twice, so that the s-polarized light B1$s$ is converted into p-polarized light B319$p$ and incident on the region 31. Since the PBS 316 is provided in the region 31 as described above, the p-polarized light B319$p$ passes through the PBS 316 and is guided to the illumination optical system.

As described above, in the present exemplary embodiment, the main component of the light from the light source 1 is p-polarized light, and s-polarized light is slightly added to the light. In the configuration according to the present exemplary embodiment, a light source for emitting such light and a PBS are combined together. Also with such a configuration, it is possible to reduce the amount of non-converted light returning to the light source, thereby projecting a brighter image. Further, in the present exemplary embodiment, unlike the third and fourth exemplary embodiments, it is possible to guide both p-polarized light and s-polarized light to the illumination optical system.

The illumination optical system provided in the direction different from that of the light source 1 includes a fly's eye lens. If the diagonal length of each lens cell of the fly's eye lens is greater than the light beam diameter of the p-polarized light B319$p$, the lens cells of the fly's eye lens are not uniformly illuminated. This causes luminance unevenness on a liquid crystal panel to which the light from the fly's eye lens is guided.

In response, in the present exemplary embodiment, the diagonal length of each lens cell of the fly's eye lens is smaller than the light beam diameter of the p-polarized light B319$p$. Consequently, it is possible to uniformly irradiate the lens cells of the fly's eye lens and also uniformly illuminate the liquid crystal panel.

Figure 15A:
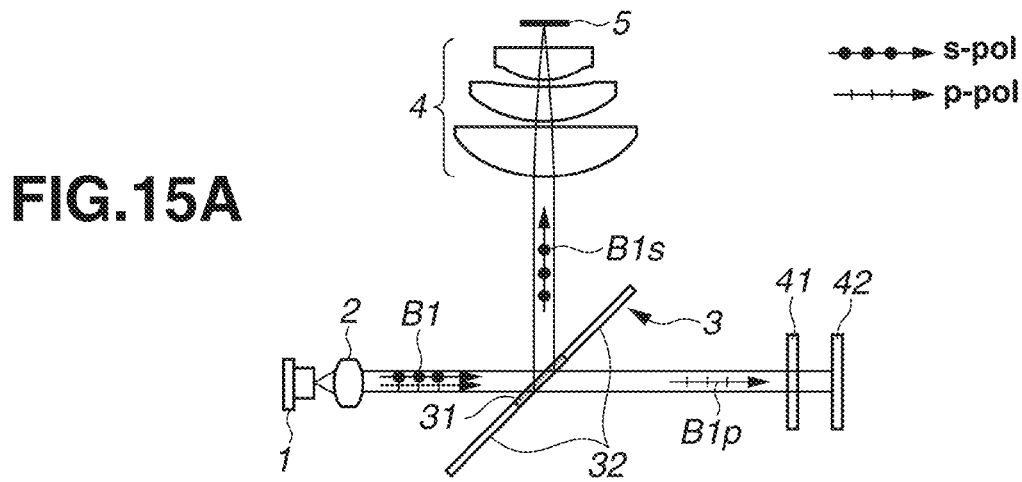
FIGS. 15A, 15B, and 15C are diagrams illustrating the configuration of a light source apparatus according to a seventh exemplary embodiment of the present invention.
Figure 15B:
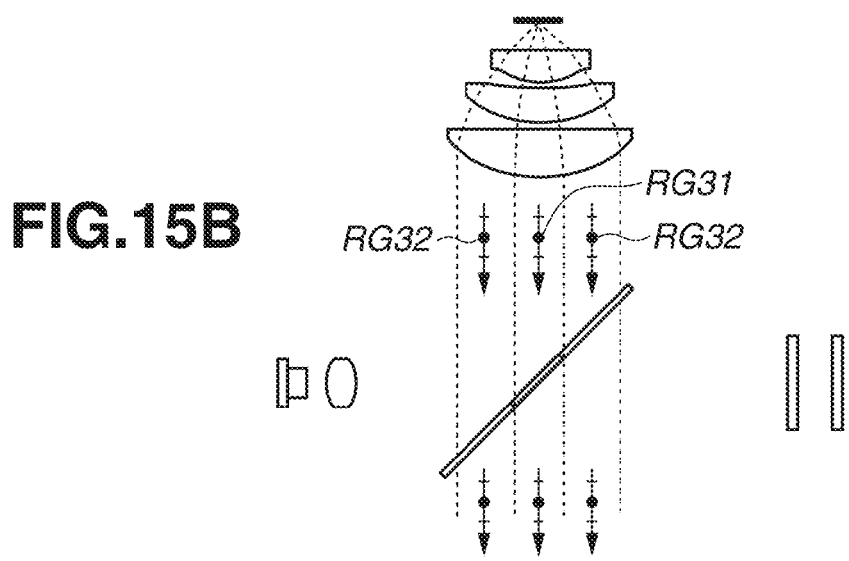
Figure 15C:
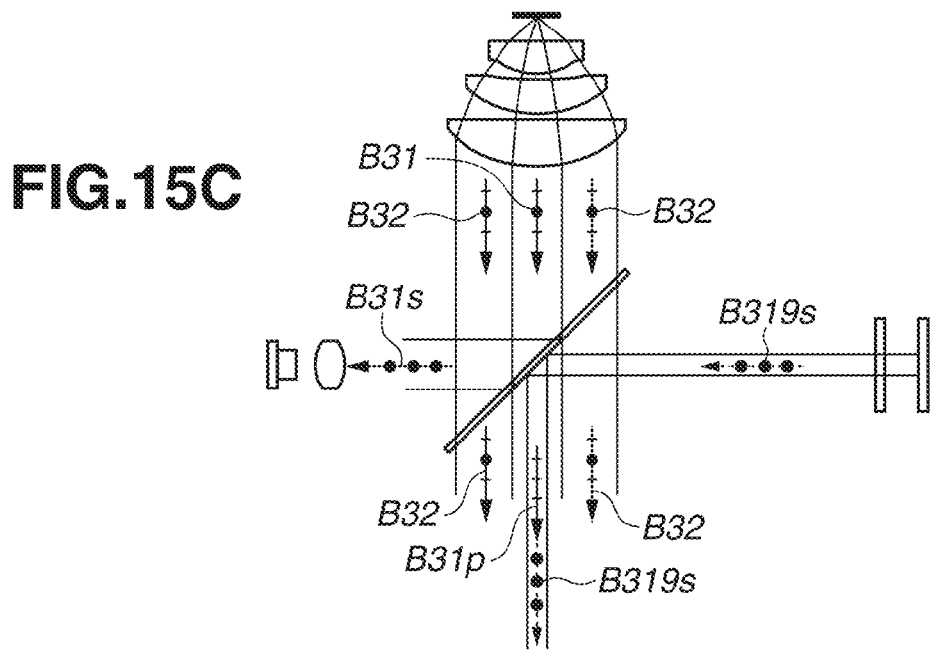

FIGS. 15A, 15B, and 15C are diagrams illustrating the configuration of a light source apparatus according to a seventh exemplary embodiment of the present invention. The present exemplary embodiment is different from the sixth exemplary embodiment in the positional relationship between the light source 1 and the fluorescent body 5. More specifically, in the sixth exemplary embodiment, the light source 1, the mirror 3, and the fluorescent body 5 are arranged in a straight line. In contrast, in the present exemplary embodiment, the light source 1, the mirror 3, and the fluorescent body 5 are not arranged in a straight line. Further, the blue light B1, which is the light from the light source 1 in the present exemplary embodiment, is polarized light containing p-polarized light B1$p$ and s-polarized light B1$s$ similarly to the blue light B1 in the sixth exemplary embodiment.

First, with reference to FIG. 15A, a description is given of the process up until, among the blue light B1, the polarized light B1$s$ reaches the fluorescent body 5, and the polarized light B1$p$ is guided in a direction different from that of the fluorescent body 5. The process until the blue light B1 is incident on the region 31 is similar to that of the second exemplary embodiment. In the present exemplary embodiment, however, unlike the second exemplary embodiment, in the region 31, a PBS 317 is provided, which has a characteristic similar to that of the fourth exemplary embodiment. Thus, among the blue light B1 incident on the region 31, the polarized light B1$s$, which is s-polarized light, is reflected by the PBS 317 and guided to the fluorescent body 5. Then, the polarized light B1$s$ reaches the fluorescent body 5. On the other hand, among the blue light B1, the polarized light B1$p$, which is p-polarized light, passes through the region 31 and is guided in the direction different from that of the fluorescent body 5. In the present exemplary embodiment, the quarter-$\lambda$ plate 41 and the mirror 42 are provided in the direction different from that of the fluorescent body 5 similarly to the sixth exemplary embodiment.

The present exemplary embodiment is similar to the fourth exemplary embodiment in that the fluorescent body 5 converts part of the s-polarized light B1$s$ into fluorescent light having a wavelength different from that of the s-polarized light B1$s$ and emits the fluorescent light and non-converted light having the same wavelength as that of the s-polarized light B1$s$.

Next, with reference to FIG. 15B, a description is given of the process up until the fluorescent light emitted from the fluorescent body 5 reaches the mirror 3 and is guided to an illumination optical system. The process until the fluorescent light travels from the lens unit 4 to the mirror 3 is similar to that of the fourth exemplary embodiment. In the region 32, a mirror 327 is provided, which has a characteristic similar to that of the mirror 324. The PBS 317, which is provided in the region 31, has a characteristic similar to that of the PBS 314. Thus, the process until fluorescent light RG31, fluorescent light RG32, and non-converted light B32 are guided to the illumination optical system is similar to that of the fourth exemplary embodiment. Further, also the process until s-polarized light B31s is reflected by the PBS 317 and returns to the light source 1 is similar to that of the fourth exemplary embodiment. Further, also the process until p-polarized light B31p is guided in a direction different from that of the light source 1 is similar to that of the fourth exemplary embodiment.

Next, with reference to FIG. 15C, a description is given of the process up until the polarized light B1p guided in the direction different from that of the fluorescent body 5 returns to the mirror 3 and is guided to the illumination optical system. Similarly to the sixth exemplary embodiment, the polarization direction of the polarized light B1p is changed by the quarter-λ plate 41, and the polarized light B1p is incident on the quarter-λ plate 41 again by the mirror 42. In the sixth exemplary embodiment, however, the polarized light B1s is converted into the polarized light B319p and returns to the mirror 3, whereas in the present exemplary embodiment, polarized light B319s, which is s-polarized light, returns to the mirror 3. The polarized light B319s returning to the mirror 3 is incident on the region 31 and reflected by the PBS 317. Then, the polarized light B319s is guided to the illumination optical system.

As described above, also in the present exemplary embodiment, similarly to the sixth exemplary embodiment, it is possible to guide both p-polarized light and s-polarized light to the illumination optical system.

In the present exemplary embodiment, the diagonal length of each lens cell of the fly's eye lens included in the illumination optical system is smaller than the light beam diameter of the s-polarized light B319s. Consequently, similarly to the sixth exemplary embodiment, it is possible to uniformly illuminate the liquid crystal panel.

Other Exemplary Embodiments

In the above exemplary embodiments, as the configuration of the projection display apparatus on which the light source apparatus according to the exemplary embodiments of the present invention can be mounted, a reflective liquid crystal projector has been shown as an example. The present invention, however, is not limited to this. Alternatively, any image display apparatus may be used, such as a projector or a television using a transmissive liquid crystal panel.

Further, in the above exemplary embodiments, as the configuration of the projection display apparatus on which the light source apparatus according to the exemplary embodiments of the present invention can be mounted, the light from the light source apparatus is incident on a polarizing plate first as an example. The present invention, however, is not limited to this. For example, an integrator using a fly's eye lens and a polarization conversion element for converting non-polarized light into linearly polarized light may be arranged instead of the polarizing plate so long as a projection display apparatus is used.

Further, in the above exemplary embodiments, as the configuration of the projection display apparatus on which the light source apparatus according to the exemplary embodiments of the present invention can be mounted, a projection lens has been shown as an example. The present invention, however, is not limited to this. For example, a configuration using an attachable and detachable projection lens may be employed so long as a projection display apparatus is used.

Further, in the above exemplary embodiments, a light source apparatus using an LD light source for emitting blue light has been described as an example. The present invention, however, is not limited to this. For example, a blue LED light source may be used so long as the light source emits light in the blue wavelength range. Further, for example, an LD light source for emitting green light or red light may be used so long as a color image can be displayed.

Further, in some of the above exemplary embodiments, a light source apparatus using an LD light source for emitting polarized light containing p-polarized light and s-polarized light has been shown as an example. The present invention, however, is not limited to this. For example, an LED light source for emitting non-polarized light may be used so long as the amount of non-converted light returning to the light source is reduced. Further, as a light source for emitting circularly polarized light, for example, a quarter-λ plate and an LD light source may be combined together.

Further, in the above exemplary embodiments, a light source apparatus including only an LD light source as a light source for emitting blue light has been shown as an example. The present invention, however, is not limited to this. For example, a blue LED light source may be included in addition to the LD light source so long as the amount of non-converted light returning to the light sources is reduced. In the configuration in which the blue LED light source is added, part of non-converted light is guided to an illumination optical system, whereby it is possible to further reduce the output of the blue LED light source.

Further, in the above exemplary embodiments, a light source apparatus and a projection display apparatus configured to guide white light (visible light) to an illumination optical system have been described as an example. The present invention, however, is not limited to this. Alternatively, a projection display apparatus may be configured to project only infrared light and ultraviolet light instead of visible light or project visible light in addition to infrared light and ultraviolet light. Yet alternatively, a light source apparatus mounted on such a projection display apparatus may be used.

Further, in some of the above exemplary embodiments, the configuration of a light source apparatus using a PBS for transmitting p-polarized light and reflecting s-polarized light has been described as an example with respect to blue light. The present invention, however, is not limited to this. For example, a PBS having the characteristic of reflecting p-polarized light and transmitting s-polarized light may be used with respect to blue light so long as the amount of non-converted light returning to the light source is reduced.

Further, in some of the above exemplary embodiments, the configuration of a light source apparatus using a dichroic mirror having the characteristic of transmitting blue light and reflecting visible light of a wavelength longer than that of blue light has been described as an example. The present invention, however, is not limited to this. Alternatively, the reflectance characteristics of the dichroic mirror may be appropriately changed according to the wavelength of the light from the light source so long as the amount of non-converted light returning to the light source is reduced. Further, a reflection method such as a mirror for reflecting light regardless of the wavelength may be provided instead of the dichroic mirror in the second region so long as the amount of non-converted light returning to the light source is reduced. Alternatively, a transmission method such as glass for transmitting light regardless of the wavelength may be provided in the second region.

Further, in the above exemplary embodiments, as the lens unit having a positive power, a configuration including three lenses has been shown as an example. The present invention, however, is not limited to this. For example, a configuration including one lens, two lenses, or more than three lenses may be employed so long as the entire lens unit has a positive power. As a condensing lens unit including three lenses, the three lenses may be attached to the light source apparatus in an integrated manner, or each of the three lenses may be separately attached to the light source apparatus.

Table 1 describes a numerical example when the lens unit 4 includes four lenses.

In table 1, a surface number is a number assigned to the surface of each lens in order from the light source 1 side. Further, R represents the radius of curvature, d represents the surface distance (the physical distance from the next surface), and $n_d$ and $v_d$ represent the refractive index and the Abbe number, respectively, of the d-line of a glass material. An effective diameter represents as a diameter an effective region through which a ray of light passes on the surface.

A surface in which an asterisk (*) is added to the right of the surface number indicates an aspheric shape according to a function indicated by the following expression (1), and the coefficients of the function are indicated in table 2. In expression (1), X indicates coordinates in the direction of an optical axis in a cross section parallel to that in FIGS. 2A, 2B, and 2C, and Y indicates coordinates in a direction orthogonal to the optical axis in a cross section parallel to that in FIGS. 2A, 2B, and 2C.

$$X = \frac{Y^2/R}{1+\sqrt{1-(1+K)(Y/R)^2}} + A_4Y^4 + A_6Y^6 + A_8Y^8 + A_{10}Y^{10} + A_{12}Y^{12} + A_{14}Y^{14} + A_{16}Y^{16} + A_{18}Y^{18} + A_{20}Y^{20} \quad (1)$$

Figure 16:
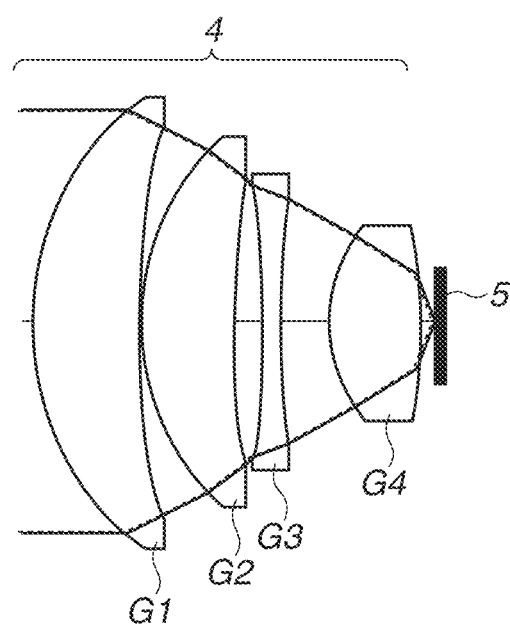
FIG. 16 is a diagram illustrating the configuration of a condensing optical system according to another exemplary embodiment of the present invention.

As illustrated in FIG. 16, the lens unit 4 includes, in order from the light source 1 (not illustrated) side, a meniscus lens G1, which has a positive refractive power and is convex on the light source 1 side, a meniscus lens G2, which has a positive refractive power and is convex on the light source 1 side, a spherical lens G3, which has a negative refractive power, and an aspheric lens G4, which has a positive refractive power and of which the surface on the light source 1 side has an aspheric shape.

This configuration is a minimum configuration for satisfying the following two requirements for the lens unit 4.

Firstly, to introduce as much fluorescent light emitted as diffused light from the fluorescent body 5 as possible, the lens unit 4 introduces the fluorescent light at the greatest possible angle and emits the fluorescent light as an approximately parallel light beam. This can further increase the light use efficiency of the light source apparatus.

Secondly, the fluorescent light emitted from the fluorescent body 5 is light in a very wide wavelength range as illustrated in FIG. 3B. Thus, due to the differences in refractive index among wavelengths, the fluorescent light may lead to deterioration of chromaticity and color unevenness when used in the illumination optical system. Thus, with respect to the fluorescent light, chromatic aberration needs to be properly corrected in addition to spherical aberration.

As described above, it is desirable that the lens unit 4 should introduce the fluorescent light at the greatest possible angle. In terms of a numerical aperture (NA), it is desirable that the lens unit 4 should introduce a ray of light having the largest possible NA. Generally, however, a ray of light passing through a peripheral portion of a spherical lens is refracted more strongly than a ray of light passing through a central portion and intersects the optical axis at a position shifted from the position where the ray of light passing through the central portion intersects the optical axis. This causes so-called spherical aberration. That is, the larger NA the ray of light has, the more likely spherical aberration occurs. Thus, the spherical lens G3, which has a negative refractive power, causes aberration opposite to that of the meniscus lenses G1 and G2, which have a positive refractive power, thereby canceling out the spherical aberration.

Even if the spherical aberration has been corrected, the position where a ray of light of each wavelength intersects the optical axis is shifted due to the differences in refractive index between wavelengths. This causes so-called axial chromatic aberration. Thus, the meniscus lenses G1 and G2, each of which has a large Abbe number (low dispersion), and the spherical lens G3, which has a small Abbe number (high dispersion), are used in combination to correct the axial chromatic aberration. The correction of the axial chromatic aberration can also correct color flare caused by the axial chromatic aberration.

To satisfy such conditions, in the lens unit 4 according to the present numerical example, a biconcave lens having a high-dispersion negative refractive power is placed as the spherical lens G3. Further, the aspheric lens G4 is used to particularly correct the angle of refraction of a ray of light passing through a peripheral portion of the lens, thereby correcting spherical aberration that cannot be eliminated by the spherical lens G3.

At this time, if the refractive power of the spherical lens G3 is made too strong or, conversely, made too weak relative to the refractive power of the entire lens unit 4 and the refractive power of the aspheric lens G4, the above correction may not be properly made. In the present numerical example, conditions for the refractive powers of the spherical lens G3 and the aspheric lens G4 that allow proper correction are determined using focal lengths.

When the focal length of the spherical lens G3 is f3, the focal length of the aspheric lens G4 is f4, and the focal length of the entire lens unit 4 is f, it is desirable that $1.0 < |f3/f| < 3.5$ $1.5 < |f3/f4| < 4.5$ should be satisfied. Further, it is more desirable that conditions $1.8 < |f3/f| < 2.8$ $2.5 < |f3/f4| < 3.5$ should be satisfied.

The values of the above conditional expressions and the focal lengths of the lenses in the present exemplary embodiments are indicated in table 3.

TABLE 1

| R | d | $n_d$ | $v_d$ | effective | diameter |
|---|---|---|---|---|---|
| OBJ | ∞ | ∞ | | | |
| 1 | 22.199 | 8.30 | 1.729 | 54.6 | 33.0 |
| 2 | 59.388 | 0.30 | 30.5 | | |
| 3 | 18.941 | 7.40 | 1.729 | 54.6 | 26.5 |
| 4 | 65.480 | 2.38 | 22.6 | | |
| 5 | −54.918 | 1.20 | 1.808 | 22.7 | 21.8 |
| 6 | 65.468 | 3.75 | 19.8 | | |
| 7* | 9.272 | 7.30 | 1.693 | 53.1 | 14.2 |

TABLE 1-continued

| R | d | $n_d$ | $v_d$ | effective diameter |
|---|---|---|---|---|
| 8 | −54.740 | 1.20 | 8.8 | |
| IMG | ∞ | 2.5 | | |

TABLE 2

Aspheric Coefficients

| surface number | K | A4 | A6 | A8 | A10 | A12 |
|---|---|---|---|---|---|---|
| 7 | −3.5393 | 9.6030e−5 | 7.3267e−6 | −1.1679e−7 | −7.8246e−10 | 1.9452e−11 |

TABLE 3

Focal Lengths and Values of Conditional Expressions

| | |
|---|---|
| f | 16.501 |
| f1 | 44.436 |
| f2 | 34.253 |
| f3 | −36.794 |
| f4 | 11.994 |
| |f3/f| = | 2.23 |
| |f3/f4| = | 3.08 |

Further, in the above exemplary embodiments, the first region is located at the center of an optical element, and the second region is located in the outer periphery of the first region. The present invention, however, is not limited to this. For example, the first region and the second region may be located at positions eccentric to the center of the optical element so long as the amount of non-converted light returning to the light source is reduced.

Further, in some of the above exemplary embodiments, a configuration has been shown as an example in which a dichroic mirror is provided in the first region. The present invention, however, is not limited to this. For example, a dichroic prism may be used so long as the amount of non-converted light returning to the light source is reduced.

Further, in the above exemplary embodiments, a configuration has been shown as an example in which an optical element is formed in an integrated manner. The present invention, however, is not limited to this. For example, two types of separate mirrors having reflectance characteristics different from each other may be provided to be adjacent to each other so long as two regions having characteristics different from each other are provided.

Further, in some of the above exemplary embodiments, a configuration using a dichroic mirror and a mirror for reflecting all visible light has been shown as an example. Alternatively, these components may be, for example, a metal mirror and a dielectric multilayer mirror so long as the characteristics in the above exemplary embodiments can be achieved.

Further, in the above exemplary embodiments, a configuration including a light source, a lens, a mirror, a lens unit, and a fluorescent body has been shown as an example. The present invention, however, is not limited to this. For example, neither a lens nor a lens unit may be used, or only either a lens or a lens unit may be used, so long as the amount of non-converted light returning to the light source can be reduced.

Further, in the above exemplary embodiments, as a configuration in which the light from the light source is incident on the first region, a lens is placed in the traveling direction of the light from the light source. The present invention, however, is not limited to this. For example, the light from a plurality of light sources may be compressed, converted into parallel light, and incident on the first region so long as the light from the light sources is incident on the first region.

Further, in the above exemplary embodiments, a projection display apparatus on which the light source apparatus according to the exemplary embodiments of the present invention can be mounted has been shown as an example. The present invention, however, is not limited to this. Alternatively, the light source apparatus according to the exemplary embodiments of the present invention may be mounted as, for example, a backlight for a liquid crystal display or an electronic viewfinder.

Figure 17:
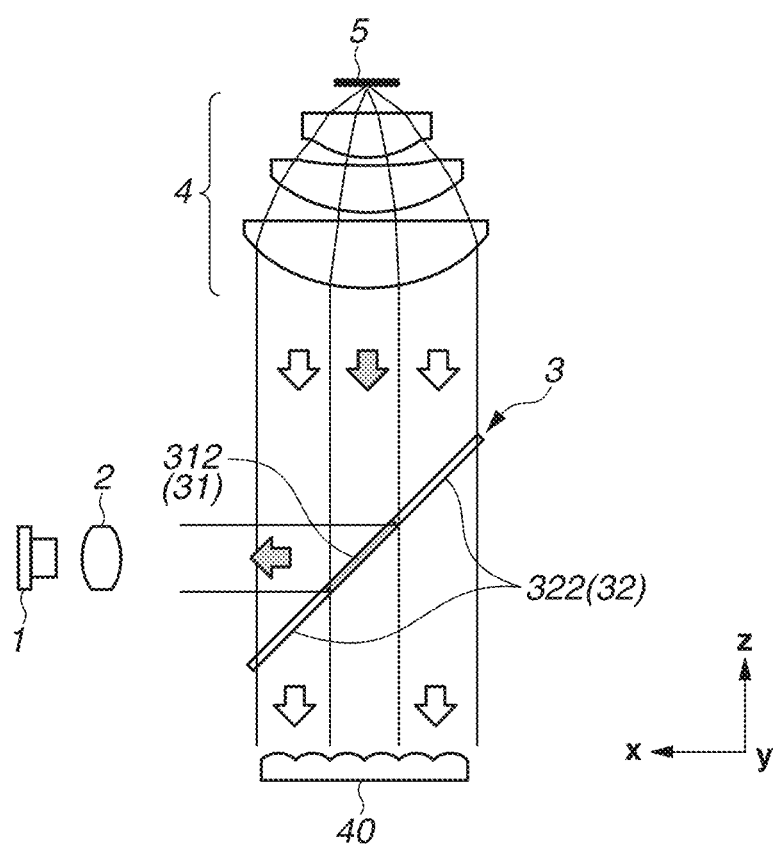
FIG. 17 is a diagram illustrating the configuration of the light source apparatus according to each exemplary embodiment of the present invention.

Further, in the above exemplary embodiments, the relationship between the region 31 and the fly's eye lens is as illustrated in FIG. 17. With reference to FIG. 17, a description is given below based on the second exemplary embodiment. The configuration as illustrated in FIG. 17, however, is employed also in the other exemplary embodiments.

FIG. 17 illustrates a fly's eye lens 40, which is included in the illumination optical system described above. With respect to the light from the fluorescent body 5, the non-converted light incident on the region 31 returns to the light source 1 side, whereas the fluorescent light incident on the region 31 passes through the region 31 and is incident on the fly's eye lens 40. On the other hand, the non-converted light and the fluorescent light incident on the region 32 are both incident on the fly's eye lens 40. In FIGS. 17 to 22, a direction parallel to the optical axes of the lens cells of the fly's eye lens 40 is a z-axis direction, the traveling direction of the light beam from the light source 1 is a x-axis direction, and a direction orthogonal to the z-axis direction and the x-axis direction is an y-axis direction. Further, dotted ellipses illustrated in FIGS. 18 to 21A and 21B are the outlines of the non-converted light and the fluorescent light traveling from the fluorescent body 5 to the mirror 3 through the lens unit 4.

In this case, the illumination optical system (not illustrated) includes the fly's eye lens 40 (FIG. 17) as a first fly's eye lens, a second fly's eye lens, and a condenser lens. For example, the case is considered where the sides of the region 31 do not coincide with the boundaries between lens cells of the fly's eye lens 40. In this case, when viewed along the directions of the optical axes of the lens cells of the fly's eye lens 40, a partial region of a predetermined lens cell overlaps the region 31, and the other region does not overlap the region 31.

That is, the non-converted light having passed outside the region 31 from the fluorescent body 5 is incident on the partial region of the lens cell, while the non-converted light is not incident on the other region because the region 31 reflects the non-converted light.

In other words, the predetermined lens cell includes a region on which the non-converted light is incident, and a region on which the non-converted light is not incident. This may cause color unevenness.

Each lens cell of the fly's eye lens 40 as the first fly's eye lens is optically conjugate to the liquid crystal panel 35. The light beam having passed through the lens cells of the fly's eye lens 40 is superimposed on the liquid crystal panel 35 by the second fly's eye lens and the condenser lens.

Thus, if color unevenness has occurred in the predetermined lens cell of the fly's eye lens 40, color unevenness may also occur in a projected image.

Accordingly, in each exemplary embodiment of the present invention, the area of the region 31 as viewed along the directions of the optical axes of the lens cells of the fly's eye lens 40 is A, the area of each lens cell as viewed along the directions of the optical axes of the lens cells of the fly's eye lens 40 is B, and n is a natural number. Also, n is a natural number of 1 or larger. At this time, the light source optical system according to the exemplary embodiment of the present invention satisfies $$B \times (n-0.1) \leq A \leq B \times (n+0.1)$$

In the other words, an area A is the area of the region as viewed in the direction of an optical axis of a predetermined lens cell among a plurality of lens cells. And an area B is the area of the predetermined lens cell as viewed in the direction of the optical axis of the predetermined lens cell in a plurality of lens cells.

It is more desirable that the light source optical system according to the exemplary embodiment of the present invention should satisfy $$B \times (n-0.05) \leq A \leq B \times (n+0.05)$$

Further, it is more desirable that the light source optical system according to the exemplary embodiment of the present invention should satisfy $$B \times n = A$$

Figure 18:
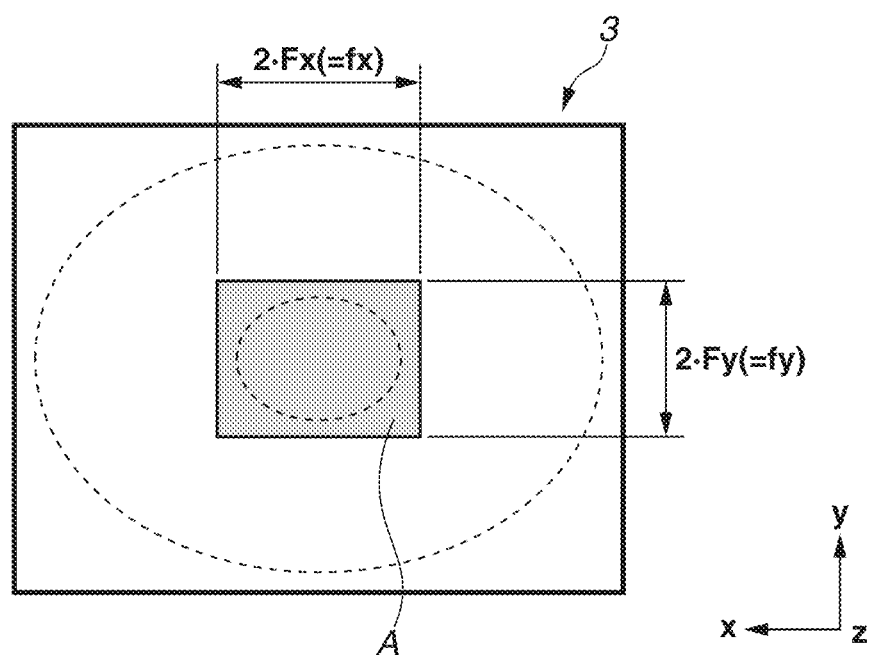
FIG. 18 is a diagram illustrating the configuration of the light source apparatus according to each exemplary embodiment of the present invention.
Figure 19A:
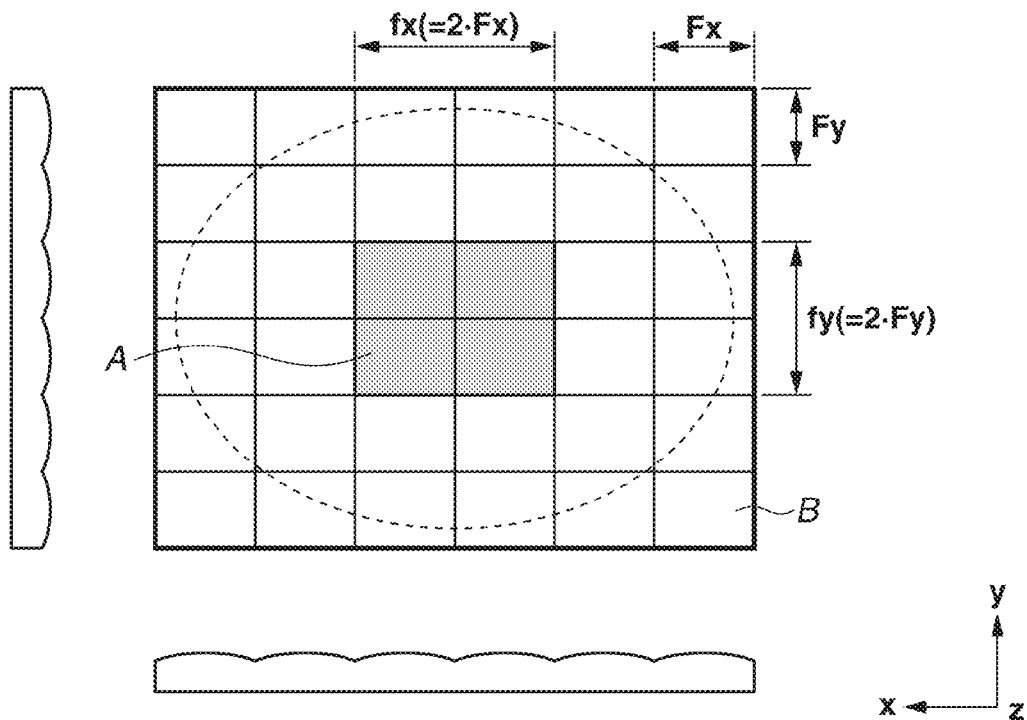
FIGS. 19A and 19B are diagrams illustrating the configuration of the light source apparatus according to each exemplary embodiment of the present invention.

The above conditional expressions is satisfied when, as illustrated in FIGS. 18 and 19A, the area A of the region 31 as viewed along the directions of the optical axes of the lens cells of the fly's eye lens 40 is an approximately natural number multiple of the area B of each lens cell as viewed along the directions of the optical axes of the lens cells of the fly's eye lens 40.

The area A of the region 31 and the area B of the lens cell are, in other words, areas obtained by perpendicularly projecting the region 31 and the lens cell on a cross section orthogonal to the optical axes of the lens cells of the fly's eye lens 40.

In the present exemplary embodiment, the outermost rays of light in the light beam from the region 31 are incident on the boundaries between lens cells of the fly's eye lens 40. In other words, when viewed in the directions of the optical axes of the fly's eye lens 40, the sides of the region 31 coincide with (overlap) the boundaries between lens cells of the fly's eye lens 40. At this time, if the above conditional expressions are satisfied, it is possible to reduce color unevenness in the lens cells of the fly's eye lens 40 and color unevenness in a projected image.

That is, when viewed in the directions of the optical axes of the lens cells of the fly's eye lens 40 and when a shape approximately similar to that of each lens cell of the fly's eye lens 40 is defined as a unit shape, the region 31 has a shape which has the same shape and size as a single unit shape, or a shape in which a plurality of unit shapes are arranged. When viewed in the directions of the optical axes of the lens cells of the fly's eye lens 40, the area of the unit shape is the same as the area B of the lens cell of the fly's eye lens 40.

Figure 19B:
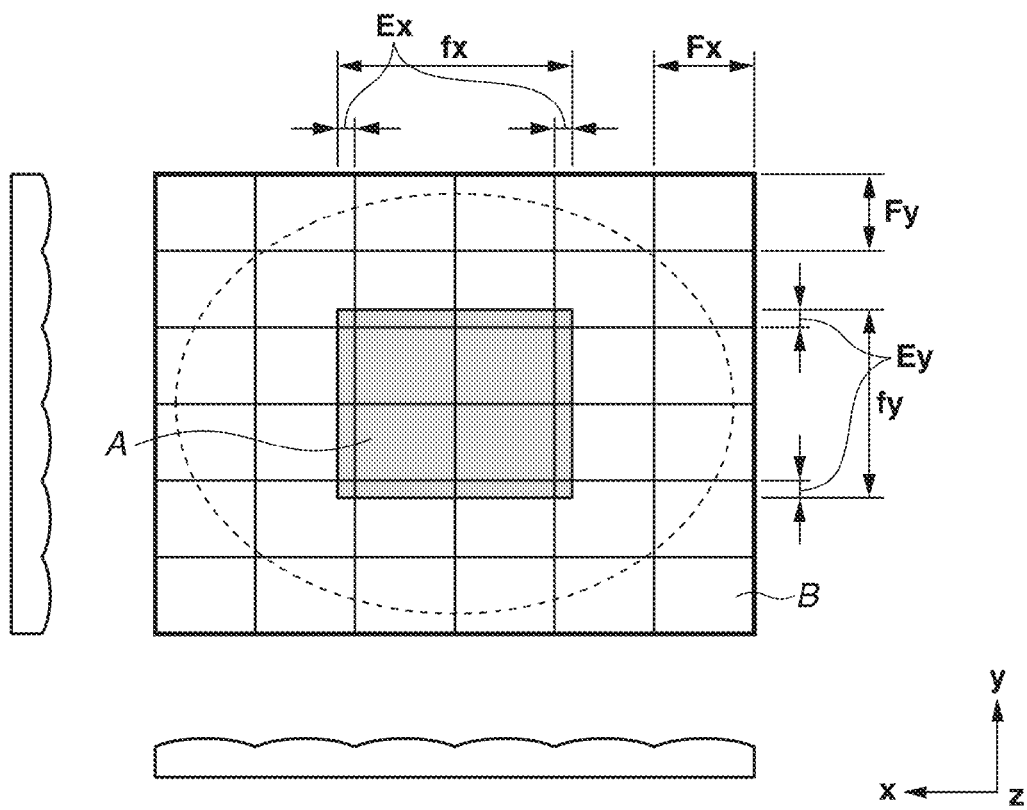

In FIGS. 18, 19A and 19B, when the dimension of one side of each lens cell of the fly's eye lens 40 is Fx and the dimension of the other side is Fy, the area of the region 31 is 4FxFy. That is, the dimensions of one side and the other side of the region 31 as viewed in the directions of the optical axes of the lens cells are obtained by multiplying Fx and Fy by the same factor. The present invention, however, is not limited to this. For example, the configuration may be such that the dimension of one side of the region 31 as viewed in the directions of the optical axes of the lens cells is Fx, while the dimension of the other side is 2Fy.

That is, the traveling direction of the light beam from the light source 1 is a first direction (the y-axis direction), a direction parallel to the optical axes of the lens cells of the fly's eye lens 40 is a second direction (the z-axis direction), and a direction orthogonal to the first direction and the second direction is a third direction (the x-axis direction).

Then, when viewed in the directions of the optical axes of the lens cells of the fly's eye lens 40 (i.e., when viewed in the z-axis direction), the dimension of each lens cell of the fly's eye lens 40 in the first direction is Fy, and the dimension of the region 31 in the first direction is fy. Further, the dimension of the lens cell of the fly's eye lens 40 in the third direction is Fx, the dimension of the region 31 in the third direction is fx, and n is a natural number.

At this time, it is desirable that the following conditions should be satisfied.

$$Fy \times (n-0.1) \leq fy \leq Fy \times (n+0.1)$$

$$Fx \times (n-0.1) \leq fx \leq Fx \times (n+0.1)$$

When viewed in the directions of the optical axes of the fly's eye lens 40, the sides of the region 31 do not need to completely coincide with the boundaries between lens cells of the fly's eye lens 40.

Specifically, when the distance in the first direction between the side of the region 31 and the boundary line between the lens cells of the fly's eye lens 40 is Ey, and the distance in the third direction between the side of the region 31 and the boundary line between the lens cells of the fly's eye lens 40 is Ex. At this time, $$Ey/Fy \leq 0.05$$

$$Ex/Fx \leq 0.05$$

may only need to be satisfied.

As shown in FIG. 19B, Ex and Ey are the total shift amounts between the side of the region 31 and the boundary line between the lens cells of the fly's eye lens 40.

In FIGS. 18 and 19, the area A of the region 31 is 4FxFy (four times the area B of each lens cell). The exemplary embodiments of the present invention, however, are not limited to this.

Figure 20A:
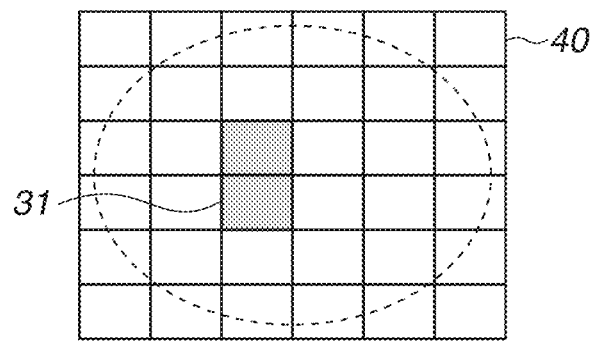
FIGS. 20A, 20B, 20C, and 20D are diagrams illustrating the configuration of the variations of the light source apparatus according to each exemplary embodiment of the present invention.
Figure 20B:
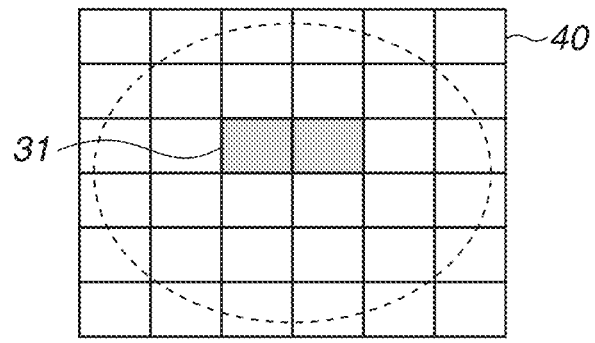

As illustrated in FIGS. 20A and 20B, the area of the region 31 may be 2FxFy. The region 31 may be vertically long as illustrated in FIG. 20A, or may be horizontally long as illustrated in FIG. 20B.

Figure 20C:
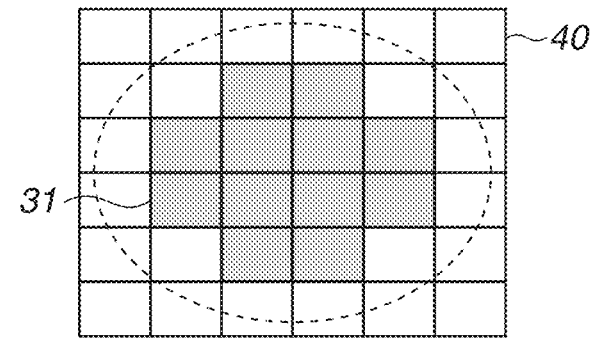

Further, as illustrated in FIG. 20C, the region 31 may not be rectangular, but may be cross-shaped.

Also in this case, it is desirable that the sides of the region 31 should coincide with the boundaries between lens cells of the fly's eye lens 40, and simultaneously, the area A of the region 31 should be an approximately natural number multiple of the area B of the lens cell.

Figure 20D:
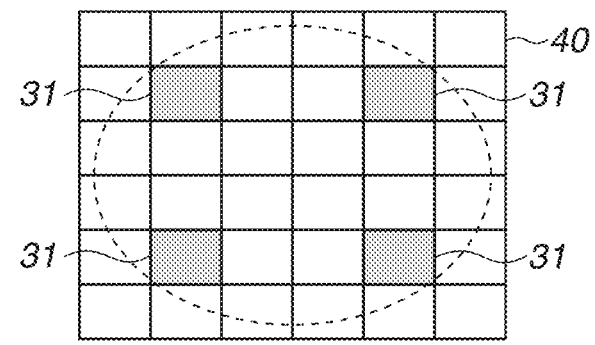

Further, as illustrated in FIG. 20D, if a plurality of regions 31 are provided and are not linked together, it is desirable that each region 31 should satisfy the above conditional expressions, and the sides of the plurality of regions 31 should coincide with the boundaries between lens cells of the fly's eye lens 40.

Figure 21A:
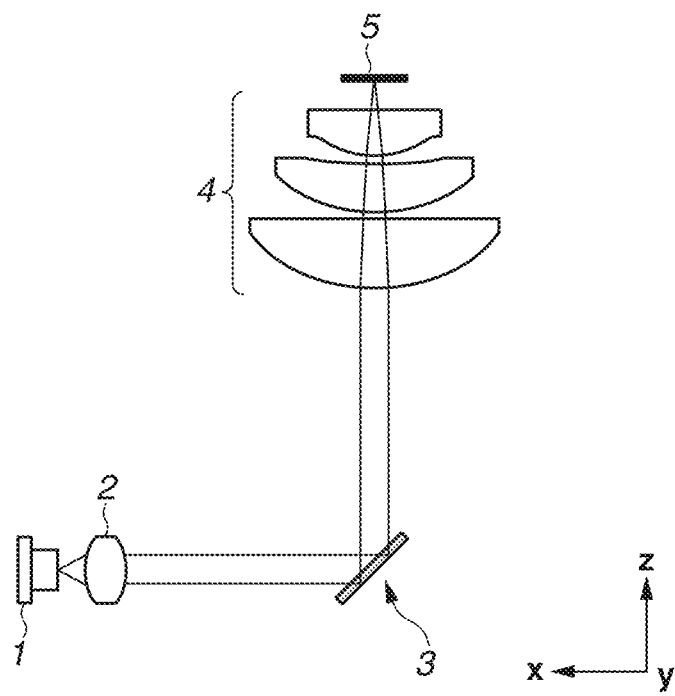
FIGS. 21A and 21B are diagrams illustrating the configuration of a variation of the light source apparatus according to the second exemplary embodiment of the present invention.
Figure 21B:
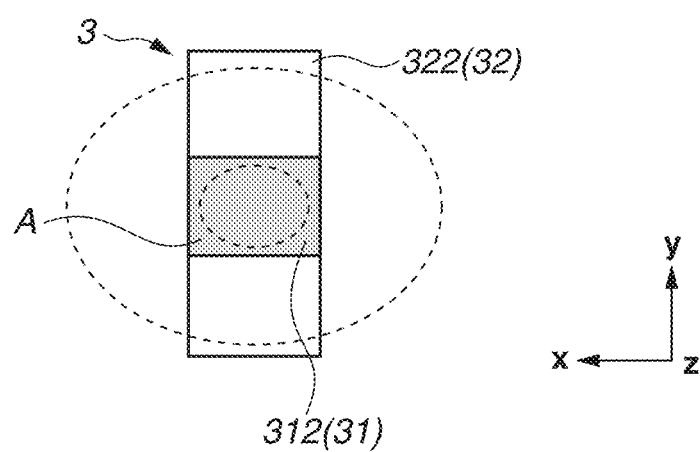

Further, the second exemplary embodiment may be changed to have the configuration illustrated in FIGS. 21A and 21B. The configuration illustrated in FIGS. 6A, 6B, and 6C is different from the configuration illustrated in FIGS. 21A and 21B in the direction in which the region 31 and the region 32 are arranged.

In the configuration illustrated in FIGS. 21A and 21B, the mirror 3 is configured such that the direction in which the region 31 and the region 32 are arranged is orthogonal to a cross section parallel to the traveling direction of the light from the light source 1 and the optical axes of the lens cells of the fly's eye lens 40.

The light source apparatus configured as illustrated in FIGS. 21A and 21B can achieve a smaller light source apparatus. Specifically, as illustrated in FIG. 22, the configuration illustrated in FIGS. 21A and 21B can bring the fly's eye lens 40 and the lens unit 4 closer to each other.

Figure 22:
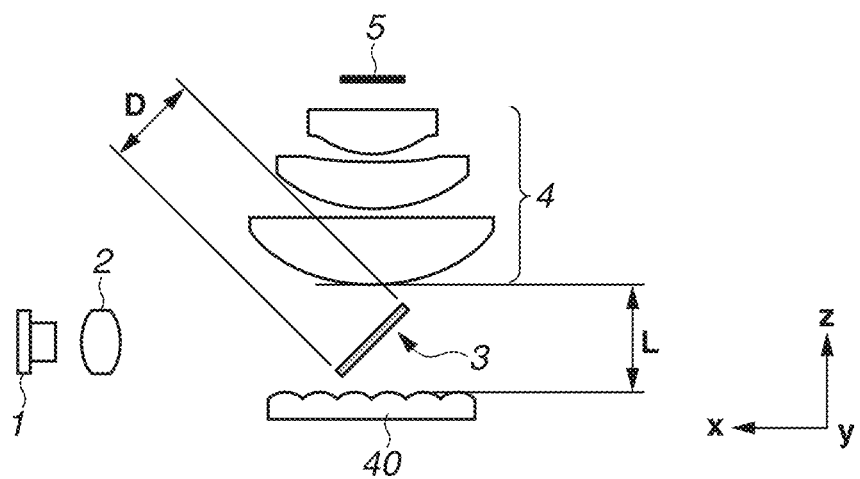
FIG. 22 is a diagram illustrating the configuration of the variation of the light source apparatus according to the second exemplary embodiment of the present invention.

As illustrated in FIG. 22, the distance between the surface vertex of the lens placed closest to the mirror 3 side in the lens unit 4 and the surface vertices of the lens cells of the fly's eye lens 40 is L. Further, the dimension of the long side of the mirror 3 in a cross section parallel to the traveling direction of the light from the light source 1 and the optical axes of the lens cells of the fly's eye lens 40 is D. Then, the angle between the long side of the mirror 3 and the optical axes of the lens cells of the fly's eye lens 40 in the cross section parallel to the traveling direction of the light from the light source 1 and the optical axes of the lens cells of the fly's eye lens 40 is θ. At this time, it is desirable that the light source optical system according to each exemplary embodiment of the present invention should satisfy $$D \cos \theta \leq L < 5D$$

This configuration can achieve a smaller light source apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-018955 filed Feb. 3, 2014, and No. 2014-261195 filed Dec. 24, 2014, which are hereby incorporated by reference herein in their entirety.

What is claimed is:

1. A light source optical system for guiding light from a light source to a fly's eye lens including a plurality of lens cells, the light source optical system comprising:
   a wavelength conversion element configured to convert the light from the light source into converted light having a wavelength different from a wavelength of the light from the light source and emit the converted light and non-converted light having the same wavelength as the wavelength of the light from the light source; and
   an optical element including a first region which guides the light from the light source to the wavelength conversion element through a lens unit, and a second region which guides the converted light and the non-converted light in a direction different from a direction of the light source,
   wherein the light from the light source is incident on the first region of the optical element, the converted light and the non-converted light are incident on the first region and the second region of the optical element, and
   wherein, on the fly's eye lens, when a distance in a first direction between a side of the first region and a boundary line between the lens cells of the fly's eye lens is Ey, and a distance in a second direction orthogonal to the first direction between a side of the first region and a boundary line between the lens cells of the fly's eye lens is Ex, $$Ey/Fy \leq 0.05$$

$$Ex/Fx \leq 0.05$$

is satisfied,
   where Fx is the dimension of a side of each lens cell of the fly's eye lens in the first direction and Fy is the dimension of a side of each lens cell of the fly's eye lens in the second direction.

2. The light source optical system according to claim 1, wherein, when a plane parallel to the optical element is a reference plane, an region where the first region is perpendicularly projected onto the reference plane is a first projection region, and an region where the optical element is perpendicularly projected onto the reference plane is a second projection region, a center of gravity of the first projection region is not concentric with a center of gravity of the second projection region.

3. The light source optical system according to claim 1, wherein the first region includes a plurality of first regions.

4. The light source optical system according to claim 1, wherein, in the first region, a dichroic mirror is provided, the dichroic mirror is configured to guide light having the same wavelength as the wavelength of the light from the light source to the wavelength conversion element and guide light having a wavelength different from the wavelength of the light from the light source in the direction different from the direction of the light source.

5. The light source optical system according to claim 1, wherein, in the first region, a polarizing beam splitter is provided, the polarizing beam splitter is configured to guide either one of p-polarized light or s-polarized light to the wavelength conversion element and guide the other polarized light in the direction different from the direction of the light source.

6. The light source optical system according to claim 1, wherein, in the first region, an opening portion is provided.

7. The light source optical system according to claim 1, wherein, in the second region, a reflection surface configured to reflect light regardless of a wavelength is provided, and
   wherein the wavelength conversion element is provided along an optical path in which the light emitted from the light source travels from the light source to the optical element.

8. The light source optical system according to claim 1, wherein, in the second region, a transmissive surface configured to transmit light regardless of a wavelength is provided, and
   wherein the wavelength conversion element is provided along an optical path in which the light from the light source is reflected by the optical element.

9. The light source optical system according to claim 1, wherein, in the second region, an opening portion is provided,
   wherein the wavelength conversion element is provided in a direction in which the light from the light source is reflected by the optical element, and wherein an area of a cross section of a light flux emitted from the lens unit on a plane parallel to the optical element is larger than an area of a projection region where the first region is perpendicularly projected onto the plane parallel to the optical element.

10. The light source optical system according to claim 1, further comprising the lens unit,
wherein the lens unit is configured to have a positive power to guide the light from the light source to the wavelength conversion element and also guide the converted light and the non-converted light to the optical element.

11. The light source optical system according to claim 1, wherein a ray of light emitted from the wavelength conversion element and passing along an optical axis of the lens unit is configured to be incident on the second region.

12. The light source optical system according to claim 1, further comprising the lens unit,
wherein the lens unit includes, in order from the optical element side, a meniscus lens G1, which has a positive refractive power and is convex on the optical element side, a meniscus lens G2, which has a positive refractive power and is convex on the optical element side, a lens G3, which has a negative refractive power, and an aspheric lens G4, which has a positive refractive power.

13. The light source optical system according to claim 12, wherein, when a focal length of the lens G3 is f3, a focal length of the aspheric lens G4 is f4, and a focal length of the entire lens unit is f, $1.0 < |f3/f1| < 3.5$ $1.5 < |f3/f4| < 4.5$ are satisfied.

14. The light source optical system according to claim 1, further comprising:
a quarter-λ plate configured to convert, among the light from the light source, a polarization direction of light guided in a direction different from a direction traveling from the optical element toward the wavelength conversion element; and
a reflection method configured to guide the light of which the polarization direction has been converted by the quarter-λ plate, to the quarter-λ plate again and also guide the light of which the polarization direction has been converted by the quarter-λ plate again, in a direction from the quarter-λ plate toward the optical element,
wherein the quarter-λ plate is provided between the optical element and the reflection method.

15. A light source optical system comprising:
a wavelength conversion element configured to convert light from a light source into converted light having a wavelength different from a wavelength of the light from the light source and emit the converted light and non-converted light having the same wavelength as the wavelength of the light from the light source; and
an optical element including a first region which guides the light from the light source to the wavelength conversion element through a lens unit, and a second region which guides the converted light and the non-converted light in a direction different from a direction of the light source,
wherein the light from the light source is incident on the first region, the converted light and the non-converted light are incident on the first region and the second region of the optical element, wherein, the first region and the second region of the optical element are arranged in a direction orthogonal to a cross section parallel to a traveling direction of the light from the light source and the optical axis of the lens unit, and
wherein, when a distance between a surface vertex of a lens placed closest to the optical element side in the lens unit and surface vertices of a plurality of lens cells is L, a dimension of a long side of the optical element in a cross section parallel to a traveling direction of the light emitted from the light source and the optical axes of the lens cells is D, and an angle between the long side of the optical element and the optical axes of the lens cells in the cross section parallel to the traveling direction of the light emitted from the light source and the optical axes of the lens cells is θ, $D \cos θ \leq L < 5D$ is satisfied.

16. A light source apparatus comprising:
a light source; and
a light source optical system for guiding light from the light source to a fly's eye lens including a plurality of lens cells,
wherein the light source optical system comprises:
a wavelength conversion element configured to convert the light emitted from the light source into converted light having a wavelength different from a wavelength of the light emitted from the light source and emit the converted light and non-converted light having the same wavelength as the wavelength of the light from the light source; and
an optical element including a first region, which has a characteristic of guiding the light from the light source to the wavelength conversion element through a lens unit, and a second region, which has a characteristic of guiding the converted light and the non-converted light in a direction different from a direction of the light source,
wherein the light from the light source is incident on the first region, and the converted light and the non-converted light are incident on the first region and the second region, and
wherein, on the fly's eye lens, when a distance in a first direction between a side of the first region and a boundary line between the lens cells of the fly's eye lens is Ey, and a distance in a second direction orthogonal to the first direction between a side of the first region and a boundary line between the lens cells of the fly's eye lens is Ex, $Ey/Fy \leq 0.05$ $Ex/Fx \leq 0.05$ is satisfied,
where Fx is the dimension of a side of each lens cell of the fly's eye lens in the first direction and Fy is the dimension of a side of each lens cell of the fly's eye lens in the second direction.

17. A light source apparatus comprising:
a light source; and
a light source optical system for guiding light from the light source to a fly's eye lens including a plurality of lens cells,
wherein the light source optical system comprises:
a wavelength conversion element configured to convert the light from the light source into converted light having a wavelength different from a wavelength of the light from the light source and emit the converted light and non-converted light having the same wavelength as the wavelength of the light from the light source; and an optical element including a first region, which has a characteristic of guiding the light from the light source to the wavelength conversion element through a lens unit, and a second region, which has a characteristic of guiding the converted light and the non-converted light in a direction different from a direction of the light source, wherein the light from the light source is incident on the first region, and the converted light and the non-converted light are incident on the first region and the second region, wherein, the optical element is configured such that a direction in which the first region and the second region are arranged is orthogonal to a cross section parallel to a traveling direction of the light from the light source and the optical axis of the lens unit, and wherein, when a distance between a surface vertex of a lens placed closest to the optical element side in the lens unit and surface vertices of a plurality of lens cells is L, a dimension of a long side of the optical element in a cross section parallel to a traveling direction of the light emitted from the light source and the optical axes of the lens cells is D, and an angle between the long side of the optical element and the optical axes of the lens cells in the cross section parallel to the traveling direction of the light emitted from the light source and the optical axes of the lens cells is θ, $D \cos θ \leq L < 5D$ is satisfied.

18. An image projection apparatus comprising:
a light modulation element;
a light source apparatus; and
an illumination optical system for guiding light from the light source apparatus to the light modulation element,
wherein the light source apparatus comprises:
 a light source; and
 a light source optical system for guiding light from the light source to a fly's eye lens including a plurality of lens cells,
wherein the light source optical system comprises:
 a wavelength conversion element configured to convert the light emitted from the light source into converted light having a wavelength different from a wavelength of the light emitted from the light source and emit the converted light and non-converted light having the same wavelength as the wavelength of the light from the light source; and
 an optical element including a first region, which has a characteristic of guiding the light from the light source to the wavelength conversion element through a lens unit, and a second region, which has a characteristic of guiding the converted light and the non-converted light in a direction different from a direction of the light source,
wherein the light from the light source is incident on the first region, and the converted light and the non-converted light are incident on the first region and the second region, and
wherein, on the fly's eye lens, when a distance in a first direction between a side of the first region and a boundary line between the lens cells of the fly's eye lens is Ey, and a distance in a second direction orthogonal to the first direction between a side of the first region and a boundary line between the lens cells of the fly's eye lens is Ex, $Ey/Fy \leq 0.05$ $Ex/Fx \leq 0.05$ is satisfied where Fx is the dimension of a side of each lens cell of the fly's eye lens in the first direction and Fy is the dimension of a side of each lens cell of the fly's eye lens in the second direction.

19. An image projection apparatus comprising:
a light modulation element;
a light source apparatus; and
an illumination optical system for guiding light from the light source apparatus to the light modulation element,
wherein the light source apparatus comprises:
a light source; and
a light source optical system,
wherein the light source optical system comprises:
 a wavelength conversion element configured to convert the light from the light source into converted light having a wavelength different from a wavelength of the light from the light source and emit the converted light and non-converted light having the same wavelength as the wavelength of the light from the light source; and
 an optical element including a first region, which has a characteristic of guiding the light from the light source to the wavelength conversion element through a lens unit, and a second region, which has a characteristic of guiding the converted light and the non-converted light in a direction different from a direction of the light source,
wherein the light from the light source is incident on the first region, the converted light and the non-converted light are incident on the first region and the second region,
wherein, the optical element is configured such that a direction in which the first region and the second region are arranged is orthogonal to a cross section parallel to a traveling direction of the light from the light source and the optical axis of the lens unit, and
wherein, when a distance between a surface vertex of a lens placed closest to the optical element side in the lens unit and surface vertices of a plurality of lens cells is L, a dimension of a long side of the optical element in a cross section parallel to a traveling direction of the light emitted from the light source and the optical axes of the lens cells is D, and an angle between the long side of the optical element and the optical axes of the lens cells in the cross section parallel to the traveling direction of the light emitted from the light source and the optical axes of the lens cells is θ, $D \cos θ \leq L < 5D$ is satisfied.

* * * * *